US010878517B2

(12) United States Patent
P B et al.

(10) Patent No.: US 10,878,517 B2
(45) Date of Patent: Dec. 29, 2020

(54) COMBINED INTERACTION MONITORING FOR MEDIA CONTENT GROUPS ON SOCIAL MEDIA SERVICES

(71) Applicant: Adobe Inc., San Jose, CA (US)

(72) Inventors: Ramesh P B, Uttar Pradesh (IN); Meagan Keane, San Anselmo, CA (US); Manish Prasad, Uttar Pradesh (IN); Laura Williams Argilla, Seattle, WA (US); Komal Kumar Desai, Uttar Pradesh (IN); Bronwyn Lewis, Seattle, WA (US)

(73) Assignee: ADOBE INC., San Jose, CA (US)

( * ) Notice: Subject to any disclaimer, the term of this patent is extended or adjusted under 35 U.S.C. 154(b) by 167 days.

(21) Appl. No.: 15/648,857

(22) Filed: Jul. 13, 2017

(65) Prior Publication Data
US 2018/0114278 A1    Apr. 26, 2018

Related U.S. Application Data

(60) Provisional application No. 62/411,959, filed on Oct. 24, 2016.

(51) Int. Cl.
G06Q 50/00      (2012.01)
G06F 16/958     (2019.01)
(Continued)

(52) U.S. Cl.
CPC ............ G06Q 50/01 (2013.01); G06F 16/48 (2019.01); G06F 16/958 (2019.01); G06Q 30/0201 (2013.01)

(58) Field of Classification Search
CPC .... G06Q 50/01; G06Q 30/0201; G06Q 30/02; G06F 16/958; G06F 16/48
See application file for complete search history.

(56) References Cited

U.S. PATENT DOCUMENTS 8,355,450 B1      1/2013  Eshet et al.
2011/0314101 A1  12/2011  Redmon et al.
(Continued)

FOREIGN PATENT DOCUMENTS

WO    2009063256    5/2009
WO    2014133479    9/2014

OTHER PUBLICATIONS

Gargi, Ullas et al. "Performance characterization and comparison of video indexing algorithms." Proceedings. 1998 IEEE Computer Society Conference on Computer Vision and Pattern Recognition (Cat. No. 98CB36231) (1998): 559-565. (Year: 1998).*
(Continued)

Primary Examiner — Katherine Kolosowski-Gager
(74) Attorney, Agent, or Firm — Kilpatrick Townsend & Stockton LLP

(57) ABSTRACT

An analytics interface is provided for a content creation tool. Based on input to the analytics interface, first and second media content items are selected, where certain content is shared between the media content items. The system modifies first and second media content items to comply with formatting constraints of first and second social media services, respectively. The system associates, via a mapping, the first and second media content items with a group and publishes the first and second media content items to the first and second social media services, respectively. The system uses the mapping to match the group with first and second analytics respectively received from the first and second social media services about the first and second media content items. The system updates the analytics interface with visual representations of grouped analytics, which are generated based on matching the group with the first second analytics.

19 Claims, 15 Drawing Sheets

(51) Int. Cl.
G06F 16/48 (2019.01)
G06Q 30/02 (2012.01)

(56) References Cited

U.S. PATENT DOCUMENTS

2014/0114746 A1* 4/2014 Pani .................... G06Q 10/067 705/14.45
2014/0212109 A1 7/2014 Gilley
2014/0331124 A1* 11/2014 Downs .................. G06F 17/212 715/243

OTHER PUBLICATIONS

Geronimo Systems, LLC, Tube Buddy, "View and Copy Video Tages from Any Video (no just your own)", https://www.tuibebuddy.com/tools#viewandcopyvideotags, Oct. 11, 2016, 2 pages.

Geronimo Systems, LLC, Tube Buddy, "Discover the Best Tages to Drive the Most Views to Your Video", https://www.tubebuddy.com/tools#suggestedtags, Oct. 11, 2016, 3 pages.

A List of the Top 25 Social Media Analytics Tools for Marketers, Keyhole, http://keyhole.co/blog/list-of-the-top-25- social-media-analytics-tools/, Jan. 19, 2016, 14 pages.

United Kingdom Application No. 1714504.6, Examination Report dated Mar. 7, 2018, 9 pages.

United Kingdom Application No. 1714504.6, Office Action dated Jan. 9, 2020, 6 pages.

Honigman, 8 Way to Track YouTube Video Performance, Social Media Examiner, Available Online At: https://www.socialmediaexaminer.com/youtube-videoperformance/, May 31, 2012, 11 pages.

United Kingdom Application No. GB1714504.6, Examination Report dated Jul. 20, 2020, 7 pages.

* cited by examiner

COMBINED INTERACTION MONITORING FOR MEDIA CONTENT GROUPS ON SOCIAL MEDIA SERVICES

CROSS-REFERENCE TO RELATED APPLICATIONS

This disclosure claims priority to U.S. Provisional Application No. 62/411,959, entitled "COMBINED INTERACTION MONITORING FOR MEDIA CONTENT GROUPS ON SOCIAL MEDIA SERVICES," filed Oct. 24, 2016, the entirety of which is hereby incorporated by reference herein.

TECHNICAL FIELD

This disclosure relates to grouping media content items (e.g., videos, images, etc.) and their associated metadata to enable monitoring of interactions with the grouped media content across multiple social media services.

BACKGROUND

Content providers, such as creators and publishers of videos or other media content provided via the Internet, utilize media portals to provide access to online media content. For example, creators publish episodic content or other videos on certain websites accessible via the Internet, such as social media services and other online services. These creators and content providers rely on social media analytics, which identify the posted media content's performance (e.g., number of views, number of visitors, types of different interactions, etc.), to guide creative decisions that can allow more distinctive media content to be generated.

Tracking the performance of media content on social media services or other online services involves significant manual effort, often across multiple media portals with different analytics of success. Some existing solutions for tracking the performance of videos and other online content involve using tools specific to certain media portals. In one example, a creator of a video tracks its performance manually by accessing a separate analytics tool for each media portal (e.g., a first analytics tool provided by YouTube®, a second analytics tool provided by Facebook®, and a third analytics tool provided by Twitter™).

Creators may also need to track videos or other media content as well as metadata (e.g., tags, keywords, and other identifiers) across multiple social media services, to interpret engagement analytics, and to understand how the engagement analytics are weighted in order to make more strategic creative and posting decisions. For instance, a creator or other content provider uses information from analytics tools provided by different media portals to manually create spreadsheets or other tracking documents for tracking analytics across multiple platforms. A creator or other content provider uses the tracking document to save keywords, tags, or other data usable for identifying certain videos or other published media content. But this requires extensive manual effort (e.g., copying and pasting from a document to a social media service) on the part of a content creator.

Existing solutions allow a creator or other content provider to view the performance of posts and other published media content across multiple social media services. But these solutions do not allow a creator or other content provider to easily identify creative decisions that would improve the performance of future online content. Furthermore, each post on a given media portal (e.g., a social media service) is treated as a separate entity. Thus, a creator or other content provider cannot group related media content items (e.g., videos or other assets) that were posted to a set of different platforms. Therefore, content providers cannot evaluate how a group of media content items, which were published to different platforms, performed as a unit.

SUMMARY

Certain embodiments involve grouping different multiple media content items (e.g., video assets) together for monitoring purposes. In one example, an analytics interface is provided for a content creation tool. Based on input to the analytics interface, first and second media content items are selected, where certain content is shared between the media content items. The system modifies first and second media content items to comply with formatting constraints of first and second social media services, respectively. The system associates, via a mapping, the first and second media content items with a group and publishes the first and second media content items to the first and second social media services, respectively. The system uses the mapping to match the group with first and second analytics respectively received from the first and second social media services about the first and second media content items. The system updates the analytics interface with visual representations of grouped analytics for the group. The grouped analytics are generated based on matching the group with the first second analytics.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

DETAILED DESCRIPTION

Figure 1:
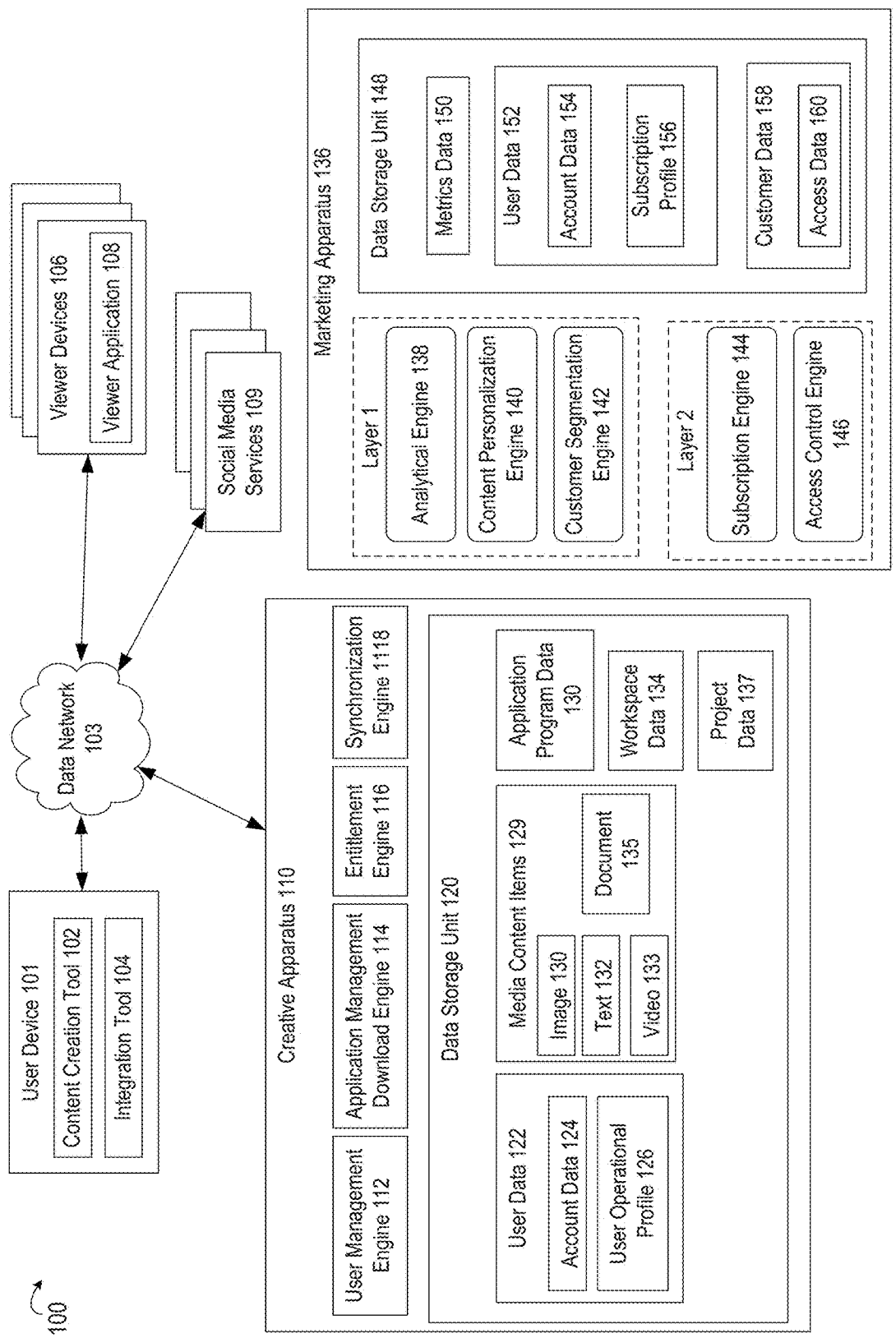
FIG. 1 is a diagram depicting an example of a network environment for grouping media content items to monitor interactions with the grouped media content across multiple social media services, according to certain embodiments.

Certain embodiments of the present disclosure include systems and methods for grouping different multiple media content items (e.g., video assets) together for monitoring purposes. For example, an integration tool is used for integrating social media analytics with a content creation tool. The social media analytics describe interactions with grouped media content (or other viewer responses to grouped media content) across multiple social media services. The content creation tool is used for creating or modifying the grouped media content. The integration tool includes software engines executed on one or more of a computing device that executes the content creation tool and a server system that causes publication of the media content to various social media services. The integration tool groups the media content items into a set, and the set of media items can be analyzed collectively across several online media portals. In some embodiments, the integration tool also allows service-specific analytics for certain media content items from the group (e.g., analytics specific to a video published to a certain social media service) to be viewed and analyzed individually.

In one example, multiple videos are added to a single group. Specifically, variations of a video depicting the same content (e.g., one or more portions of a certain movie) are assigned to the group and tracked across multiple social media services. These variations include changes to comply with formatting constraints that are specific to a given social media service, such as duration restrictions, file format requirements, aspect ratio requirements, or some combination thereof. In this example, the integration tool, in combination with a content creation tool, is used to modify certain video content to generate a five-minute video that is compliant with formatting constraints of YouTube®, a two-minute trailer version that includes some of the same video content and that is compliant with formatting constraints of Facebook®, and a 30-second version of the trailer that is compliant with formatting constraints of Twitter™. The integration tool communicates with a back-end service for publishing media content, and thereby publishes the five-minute video to YouTube®, the two-minute trailer to Facebook®, and the 30-second version of the trailer to Twitter™.

Continuing with this example, the integration tool allows performance of the set of three videos to be analyzed and treated as one asset across multiple destinations. For instance, the integration tool provides an analytics interface that allows a combined analysis of the video group for the combination of YouTube®, Facebook®, and Twitter™. In some embodiments, the analytics interface also allows for individually analyzing each variation of the video with respect to a specific social media service or other media portal (e.g., comparing the Facebook® version of the video compared against other videos posted to Facebook®).

In additional or alternative embodiments, the analytics interface provides visual indicators that identify certain portions of a video (or other media content item) that are associated with significant changes in viewer response. For example, if a certain portion of the video is associated with a sharp drop-off in viewership or a sharp increase in viewership, the drop-off or increase is reflected in the analytics (e.g., as indicated by viewers navigating away from a website with the video, stopping the video, skipping to a popular portion of the video, etc.). The integration tool identifies this change in viewer response from the analytics and determines that the change exceeds a threshold change. Based on this determination, the integration tool updates the analytics interface to indicate that the video portion is associated with the change in viewer response. For example, if the video is being played in the content creation tool, the integration tool provides an indicator in the analytics interface when the relevant video portion is being played, overlays a visual indicator on the relevant portion of the video being played, or otherwise visually indicates that certain video content is associated with the determined change in viewer response.

In some embodiments, the integration tool provides one or more tools for saving tags, keywords, and other identifiers as metadata sets. These metadata sets are used for future video posts. For example, the integration tool allows a user to apply the metadata set (e.g., a group of metadata items including tags, keywords, or both) with one button or other interaction with an element of an analytics interface. This allows a user of the content creation tool to avoid individually adding each identifier to a respective video (e.g., by copying the tags or keywords from a document to the video). In some embodiments, the integration tool provides the capability to identify which tags, keywords, and other identifiers are associated with improved performance analytics (e.g., which keywords are used as search terms to retrieve a given video or other media content item).

The analytics used by the integration tool correspond to the output a creator has generated (e.g., an image or video). The integration tool associates a project or creation point used to generate media content, analytics tracking for the media content, and an application programming interface ("API") for an online medial portal to which the media content will be posted. Thus, the location and tracking of performance analytics are improved using the integration tool. One example of integrating the analytics tracking with the media portal API includes creating an HTML5 panel (or other plug-in) that can be docked in Adobe® Premiere Pro or other content creation tools that support panel integration or other plug-ins.

In some embodiments, the integration tool is used for creating a digital video and audio ("DVA") publish service that communicates with renderers and exporters within a content creation tool. Additionally or alternatively, the DVA publish service communicates with the API of an online media portal (e.g., a social media service) via a suitable tool for publishing content (e.g., Adobe® Social) and a suitable tool for monitoring the performance of online content (e.g., Adobe® Analytics).

In one example, the DVA publish service provides an integrated publishing/performance tracking solution. Social APIs provided by Adobe® Social enable a user to publish electronic video content and other electronic media to online media portals (e.g., scheduling video publications). For example, Adobe® Premiere Pro or another suitable content creation tool allows a tracking panel or other analytics interface to expose metadata fields for items (e.g., title, description, tags, keywords, and other identifiers, categories), where the metadata fields are specific to a given social media service. Adobe® Social allows a user to post content to a social media service. The integration tool tracks the performance of videos and other media content that is created and published through the tracking panel in Adobe® Social. The performance is tracked using metadata such as tags, keywords, and other identifiers.

In some embodiments, the integration tool provides improvements over existing solutions. In one example, the integration tool provides insight into video performance (or other media content performance) on social media in a creative tool in which media content is created. In another example, the integration tool provides an integrated publishing solution and social media analytics. In another example, the integration tool reflects creator workflows. For instance, the integration tool enables a user to designate multiple videos as part of a single group and provides an interface that allows users to see the performance of this group across multiple platforms as if the group was a single asset. The integration tool also allows a user to save tags, keywords, and other identifiers as a set with a single button. These sets can be applied to future posts with a single click. The integration tool also provides an opportunity and framework for more advanced analysis of video performance. For instance, the integration tool integrates analytics directly into the creative tool.

Example of an Operating Environment for Analytics Integration

Turning now to the drawings, FIG. 1 is a diagram depicting an example of a network environment 100 for grouping media content items 129 to monitor interactions with the grouped media content across multiple social media services 109. In the example depicted in FIG. 1, the network environment 100 includes computing devices, such as a user device 101 and viewer devices 106. The user device 101 and viewer device 106 are communicatively coupled to one or more of a creative apparatus 110 and a marketing apparatus 136 via a data network 103. A user of the user device 101 uses various products, applications, or services supported by the creative apparatus 110 via the data network 103. A user of the viewer device accesses, interacts with, or otherwise uses media content items that are published to social media services 109 using one or more of the user device 101, the creative apparatus 110, and the marketing apparatus 136. Examples of the data network 103 include, but are not limited to, Internet, local area network ("LAN"), wireless area network, wired area network, wide area network, and the like.

The user device 101 executes a content creation tool 102 and an integration tool 104. Examples of a digital content creation tool 102 include, but are not limited to, a content editing tool, a content publishing tool, a content tracking tool, a content managing tool, a content printing tool, a content consumption tool, any combination of these tools, or any other tool that can be used for creating, editing, managing, generating, tracking, consuming or performing any other function or workflow related to content. The integration tool 104 integrates analytics provided by the marketing apparatus 136 with a content creation process involving the content creation tool 102 and, in some embodiments, one or more features provided by the creative apparatus 110. Examples of this integration are described in further detail herein with respect to FIGS. 2-15.

Examples of users of the system depicted in FIG. 1 include, but are not limited to, creative professionals or hobbyists who use creative tools to generate, edit, track, or manage creative content, marketing professionals who use marketing tools to generate, edit, track, or manage online content, or to manage online marking processes, end users, administrators, users who use image tools to create, edit, track, or manage images, advertisers, publishers, developers, content owners, content managers, content creators, content viewers, content consumers, designers, editors, any combination of these users, or any other user who uses digital tools to create, edit, track, or manage digital experiences.

Examples of the user devices 101 and viewer devices 106 include, but are not limited to, a personal computer, tablet computer, a desktop computer, a processing unit, any combination of these devices, or any other suitable device having one or more processors. Each user device 101 includes at least one application supported by the creative apparatus 110. It is to be appreciated that the following description is now explained using the user device 101 as an example and any other user device that can be used.

The creative apparatus 110 includes one or more engines for providing one or more digital experiences to the user. In some embodiments, these engines include one or more of the engines depicted in FIG. 1. In other embodiments, one or more of the engines depicted in FIG. 1 may be omitted from a creative apparatus 110.

The creative apparatus 110 can be implemented using one or more servers, one or more processing devices, one or more platforms with corresponding application programming interfaces, cloud infrastructure, or the like. In addition, each engine can also be implemented using one or more servers, one or more processing devices, one or more platforms with corresponding application programming interfaces, cloud infrastructure, or the like.

In some embodiments, a user of the viewer device 106 visits a webpage or an application store to explore applications supported by the creative apparatus 110. The creative apparatus 110 provides the applications (e.g., the integration tool 104) as a software as a service ("SaaS"), or as a standalone application that can be installed on the viewer device 106, or as a combination.

In some embodiments, the user creates an account with the creative apparatus 110 by providing user details and by creating login details. Alternatively, the creative apparatus 110 can automatically create login details for the user in response to receipt of the user details. In some aspects, the user is also prompted to install an application management download engine 114. The application management download engine 114 enables the user to manage installation of various applications supported by the creative apparatus 110 and to manage other functionalities, such as updates, subscription account and the like, associated with the applications. The user details are received by a user management engine 112 and stored as user data 122 in the data storage unit 120. In some aspects, the user data 122 further includes account data 124 under which the user details are stored.

In some embodiments, the user either can opt for a trial account or can make payment based on the type of account or subscription chosen by the user. Alternatively, the payment can be based on product or number of products chosen by the user. In some embodiments, based on payment details of the user, a user operational profile 126 is generated by an entitlement engine 116. The user operational profile 126 is stored in the data storage unit 148 and indicates entitlement of the user to various products or services. In some embodiments, the user operational profile 126 also indicates type of user, i.e. free, trial, student, discounted, or paid. In some embodiments, the user management engine 112 and the entitlement engine 116 can be one single engine performing the functionalities of both the engines.

The creative apparatus 110 also includes a data storage unit 120. The data storage unit 120 can be implemented as one or more databases or one or more data servers. The data storage unit 120 includes data that is used by the entitlement engine 116, synchronization engine 118, and other engines of the creative apparatus 110.

In some embodiments, the user installs various applications supported by the creative apparatus 110 via an application management download engine 114. Application installers, which may include a copy of the integration tool 104 or a copy of the content creation tool 102, are present in the data storage unit 120 and are fetched by the application management download engine 114. Plug-ins or other applications, which may be included in or stored with the application program data 128, are made available to the user directly or via the application management download engine 114. In some embodiments, application program data 128 is fetched and provided to the user via an interface of the application management download engine 114. In other embodiments, certain application program data 128 for which the user is eligible based on user's operational profile are displayed to the user. The user selects an application from the application program data 128, which can include the integration tool 104, or the applications that the user wants to download. The integration tool 104 or other application program data 128 is downloaded on the user device 101 via the application management download engine 114. Corresponding data regarding the download is also updated in the user operational profile 126. The application management download engine 114 also manages a process of providing updates to the user device 101.

In some embodiments, upon download, installation, and launching of an application program, the user is asked to provide the login details. A check is again made by the user management engine 112 and the entitlement engine 116 to ensure that the user is entitled to use the application program. In other embodiments, direct access is provided to the application program as the user is already logged into the application management download engine 114.

The user uses one or more services provided by the creative apparatus 110 to create one or more projects or assets. The services include, for example, content-creation services, content publication services, and integration services provided by one or more of the content creation tool 102 and the integration tool 104. In addition, the user also has a workspace within each application program. The workspace, as described herein, includes setting of the application program, setting of tools or setting of user interface provided by the application program, and any other setting or properties specific to the application program. Each user has a workspace. The workspace, the projects or the assets are then stored in the data storage unit 148 by a synchronization engine 118. This data can be specific to the user or can be shared with other users based on rights management.

In some embodiments, media content items 129 are stored in the data storage unit 120 or another suitable non-transitory computer-readable medium accessible to one or more of the user device 101 and the creative apparatus 110. The media content items 129 can be shared assets that a user of the user device 101 wants to share with viewers (e.g., via publication to one or more social media services 109). The media content items 129 are also accessible across multiple applications (e.g., the integration tool 104) provided by or in communication with the creative apparatus 110 or the marketing apparatus 136.

In some embodiments, each media content item 129 includes one or more files. Examples of these files include (but are not limited to) an image 130, text 132, a video 133, a document 135, a combination of any of these, and the like.

In some embodiments, workspace data 134 and project data 137 are stored in the data storage unit 120. In some embodiments, the project data 137 includes the media content items 129 or information about the media content items 129 (e.g., groupings of media content items, tags or other metadata to be applied to the media content items 129, etc.).

Each user device 101 is communicatively coupled to a marketing apparatus 136 via the data network 103. A user of the user device 101 uses various products, applications, or services supported by the marketing apparatus 136 via the data network 103. The marketing apparatus 136 includes one or more devices that provide and execute one or more engines for providing one or more digital experiences to the user. The marketing apparatus 136 can be implemented using one or more servers, one or more platforms with corresponding application programming interfaces, cloud infrastructure, and the like. In addition, each engine can also be implemented using one or more servers, one or more platforms with corresponding application programming interfaces, cloud infrastructure, and the like.

The marketing apparatus 136 also includes a data storage unit 148. The data storage unit 148 can be implemented as one or more databases or one or more data servers. The data storage unit 148 includes data that is used by the engines of the marketing apparatus 136.

In some embodiments, the marketing apparatus 136 can be divided into two layers of engines. For example, Layer 1 includes core engines that provide workflows to the user and Layer 2 includes shared engines that are shared among the core engines. Any core engine can call any of the shared engines for execution of a corresponding task. In additional or alternative embodiments, the marketing apparatus 136 does not have layers, and each core engine can have an instance of the shared engines. In various embodiments, each core engine can access the data storage unit 148 directly or through the shared engines.

In some embodiments, the user of a user device 101 visits a webpage or an application store to explore applications supported by the marketing apparatus 136. The applications are provided as a software as a service ("SaaS"), as a standalone application that can be installed on one or more user devices 101, or as a combination. A user creates an account with the marketing apparatus 136 by providing user details and also by creating login details. In additional or alternative embodiments, the marketing apparatus 136 can automatically create login details for the user in response to receipt of the user details. The user can also contact the entity offering the services of the marketing apparatus 136 and can get the account created through the entity. The user details are received by a subscription engine 144 and stored as user data 152 in the data storage unit 148. In some embodiments, the user data 152 further includes account data 154, under which the user details are stored.

A user can opt for a subscription to one or more engines of the marketing apparatus 136. Based on subscription details of the user, a user subscription profile 156 is generated by the subscription engine 144 and stored. The user subscription profile 156 is stored in the data storage unit 148 and indicates entitlement of the user to various products or services. The user subscription profile 156 also indicates type of subscription, e.g., premium subscription or regular subscription.

Although FIG. 1 depicts multiple sets of user data 122, 152 and account data 124, 154 on separate data storage units 120, 148, other implementations are possible. For example, the same data storage unit may store a common set of user data and associated account data, where the set of user data and associated account data is accessible to both the creative apparatus 110 and the marketing apparatus 136.

Each engine of the marketing apparatus 136 also stores customer data 158 for the user in the data storage unit 148. The user or the entity of the user can have one or more customers, including potential customers, and hence, the one or more engines of the marketing apparatus 136 store the customer data 158. The customer data 158 can be shared across these engines or can be specific to each engine. In some embodiments, the access data 160 is a part of the customer data 158. The access to the customer data 158 is controlled by an access control engine 146, which can be shared across the engines of the marketing apparatus 136 or each engine can have one instance of the access control engine 146. The access control engine 146 determines if the user has access to a particular customer data 158 based on the subscription of the user and access rights of the user.

A user of the marketing apparatus 136 can enable tracking of the content while creating content or at any other point. Various methods of tracking can be used. For example, tracking code can be embedded into the content for tracking and sending tracked data to the analytical engine 138. The analytical engine 138 tracks the data and stores tracked data as metrics data 150 or other analytics data. The analytical engine 138 tracks the data and performs meaningful processing of the metrics data 150 or other analytics data to provide various reports to the user. In addition, in some embodiments, the analytical engine 138 also acts as a shared engine and is accessible by other engines to obtain meaningful analysis on basis of which other engines can offer various functionalities to the user. In additional or alternative embodiments, each engine can have an instance of the analytical engine 138, which is customized according to need of that engine. In various embodiments, the analytical engine 138 is used for tracking one or more types of content, such as mobile applications, video, image, website, document, advertisements, etc. In some embodiments, the analytical engine 138 also supports predictive intelligence to provide predictions based on the metrics data 150 or other analytics data. In some embodiments, the analytical engine 138 also stitches information tracked from various sources where the content is consumed and provides a holistic view (e.g., a 360 degrees' view) of the metrics data 150 or other analytics data.

In some embodiments, the marketing apparatus 136 also includes a content personalization engine 140. The content personalization engine 140 enables the user to provide different digital experiences to the customers when different customers visit the same webpage or same application of the user. The content personalization engine 140 provides various workflows to the user to create different versions of the webpage or the application or the content and to perform A/B testing. Based on the testing, the user may choose to provide different personalization for different sets of customers. The content personalization engine 140 also uses the customer data 158. The customer data 158 includes customer profiles. The customers, as described herein, also include mere visitors that are not customers yet. A profile includes one or more attributes of a customer. An attribute, as described herein, is a characteristics allowing segmentation of customers into groups. Examples of the attribute include, but are not limited to, geographical location, age, gender, purchase capacity, language, habits, browsing trends, or any other attribute using which customers can be segmented.

The customer data 158, at least some of which may be included in the metrics data 150 or stored separately from the metrics data 150, is generated by a customer segmentation engine 142 by collecting data from different sources including electronic sources, such as the analytical engine 138, online forms, customer submitting data online, and other online sources, and non-electronic sources including paper forms and other offline sources. The customer data 158 can be shared between users and some of the customer data 158 can be specific to each user and not accessible by other users. The customer segments are used by the content personalization engine 140 to personalize content and show relevant content to the customers. In addition, the content personalization engine provides automated workflows to enable the personalization, including providing recommendations for the content that should be shown to a particular customer segment.

In various embodiments, the customer data 158 also includes data regarding devices used by the customers. The device data is used for stitching customer data. For example, customer 1 may use device 1 to visit website A. Customer 1 may user device 2 to visit website B. The website A and the website B may belong to the same user. So, instead of considering customer 1 as two different customers, the data including at least one common identifier such as email id helps the user to identify that the two different visits were made by the same customer 1. Also, by analyzing the customer data 158 and the metrics data 150 or other analytics data, richer customer profiles or segments can be generated. Also, devices that correspond to the same customer can be identified resulting in providing more targeted digital experience to the customer and making benefit for the user.

In some embodiments, the analytical engine 138 processes data received from one or more social media services 109, data generated from interactions with one or more social media services 109 by viewer devices 106, or any other data associated with one or more social media services 109. The metrics dataset 150 is generated from interactions by the viewer devices 106 with the social media services 109. The social media services 109 provide applications, data, and other functions that are accessed by one or more viewer devices 106 via the Internet or one or more other suitable data networks 103. Examples of the social media services 109 include social media websites accessible via the Internet by a viewer application 108 such as a web browser, online services accessible via the Internet by a dedicated viewer application 108 (e.g., a "Facebook®" application, a "Twitter™" application), etc.

Digital tools, as described herein, include a tool that is used for performing a function or a workflow electronically. Digital tools include the creative apparatus 110 and the marketing apparatus 136.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

Examples of Operations and Architectures for Analytics Integration

Figure 2:
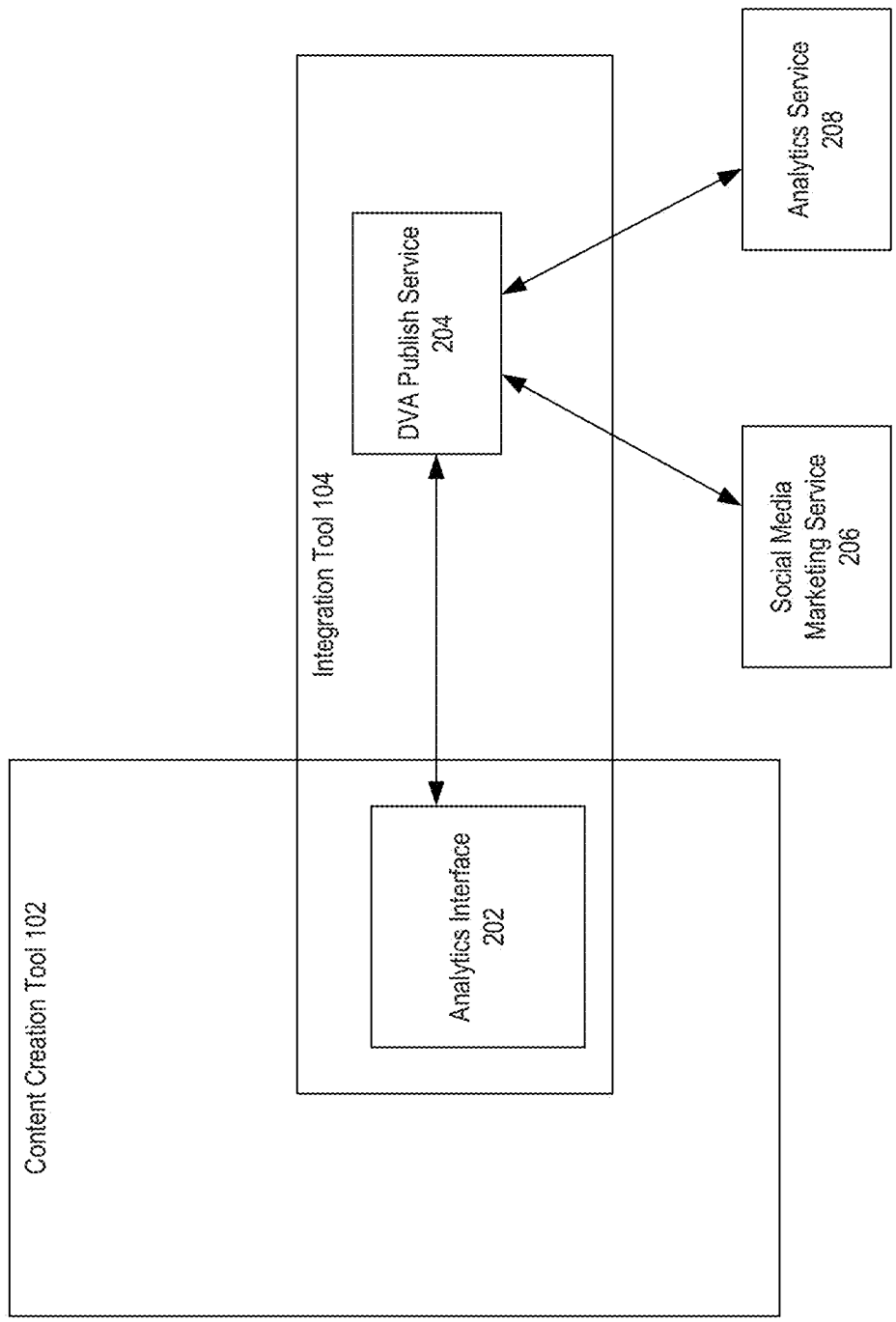
FIG. 2 is a diagram depicting an example of an integration tool communicating with a content creation tool, a social media marketing service, and an analytics service to integrate social media analytics with the content creation tool for content creation, according to certain embodiments.

FIG. 2 is a diagram depicting an example of an integration tool 104 communicating with a content creation tool 102 (e.g., Adobe® Premiere Pro), a social media marketing service 206 (e.g., Adobe® Social), and an analytics service 208 (e.g., Adobe® Analytics) to integrate social media analytics with content creation. The integration tool 104 is a plug-in that is added to or otherwise in communication with the content creation tool 102. In some embodiments, the social media marketing service 206 and analytics service 208 are executed on one or more of the creative apparatus 110 and the marketing apparatus 136 depicted in FIG. 1.

Figure 3:
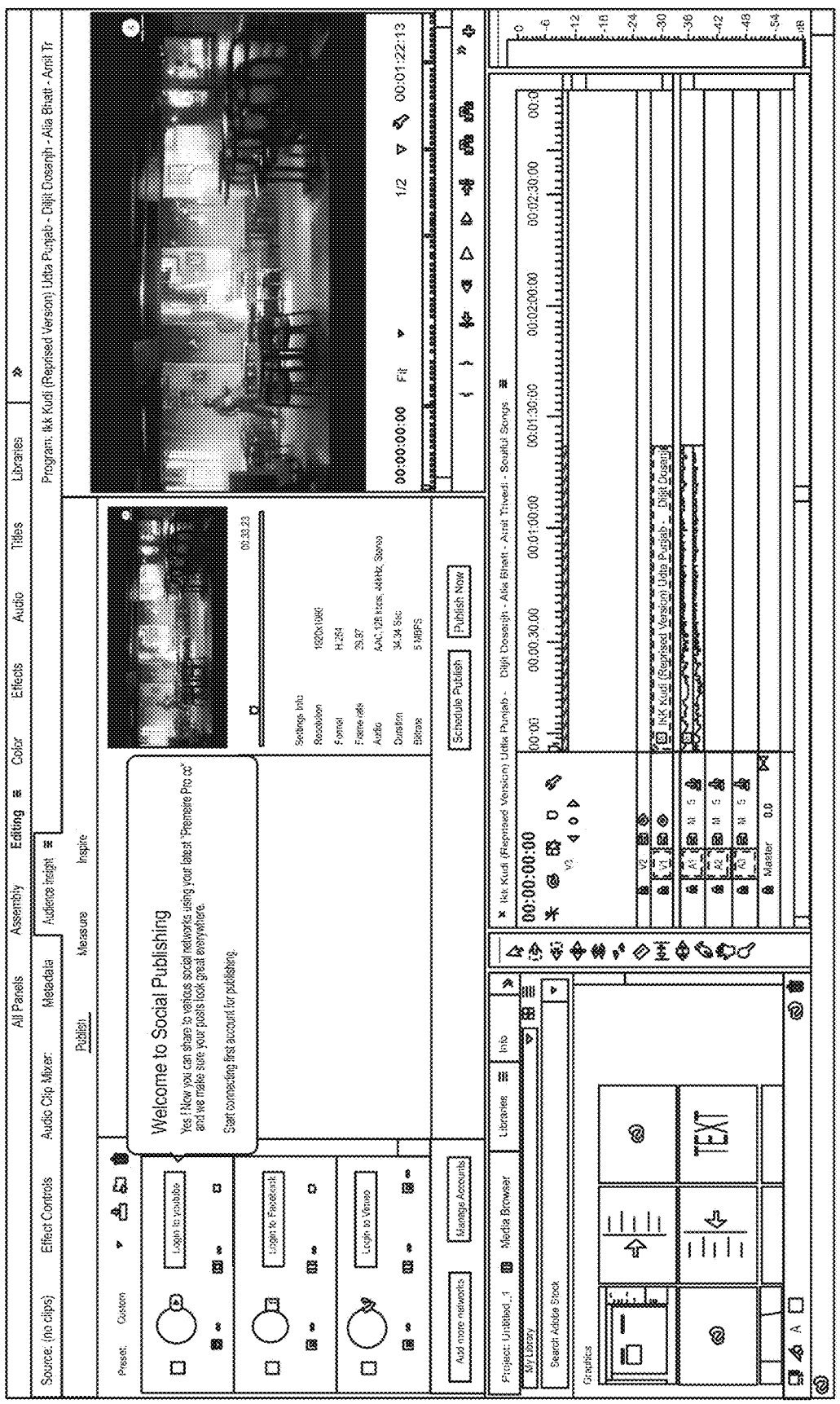
FIG. 3 depicts an example of an analytics interface used by an integration tool, according to certain embodiments.

The integration tool 104 generates and updates an analytics interface 202 that is presented in the content creation tool 102. In one example, the analytics interface 202 is an HTML5 panel that is docked or otherwise added to one or more interfaces native to the content creation tool 102. For instance, FIG. 3 depicts an example of an analytics interface 300 (i.e., a specific example of the analytics interface 202) that is available via an "Audience Insights" tab of a particular content creation tool 102. The analytics interface 300 allows a user to provide credentials for logging into different social media services and to perform integrated analytics tracking, as described in detail herein.

In some embodiments, the social media marketing service 206 provides a common workflow for publishing media content items (e.g., online marketing content items) to various social media services 109. For example, the social media marketing service 206 allows different media content items from a common group (or project) to be published across multiple social media services 109 in a manner that maintains thematic consistency. The social media marketing service 206 is also useful for monitoring trends regarding which types of online content are being searched, accessed, or otherwise used in different social media services 109.

In some embodiments, the analytics service 208, which includes or uses the analytical engine 138 depicted in FIG. 1, generates analytics in real time in response to viewers using or accessing media content items that are published to social media services 109. The analytics service 208 is used to identify segments of different viewers that use or otherwise access online media content items. The analytics service 208 provides insights into how viewers respond to online content, such as media content items posted to social media services 109 or other online portals. The analytics service 208 collects and analyzes data regarding measureable actions that a viewer takes while interacting with online content (e.g., searches, clicks, playback actions, navigation actions, etc.). In some embodiments, this allows the analytics service 208 to identify patterns and behaviors in large amounts of data generated by viewers' interactions involving online content.

In some embodiments, the integration tool 104 creates a DVA publish service 204 that is used for communication with the social media marketing service 206 and the analytics service 208. The integration tool 104 communicates with the social media marketing service 206. This allows media content items, which are generated or modified with the content creation tool 102, to be published to different social media services 109. The integration tool 104 also communicates with the analytics service 208 using the DVA publish service 204. This allows analytics to be provided to the integration tool 104 after publication of the media content items. These analytics are generated by, for example, views of media content items as published to different social media services 109, interactions with media content items as published to different social media services 109 and interactions, and other viewer use or viewer access of published media content items.

Figure 4:
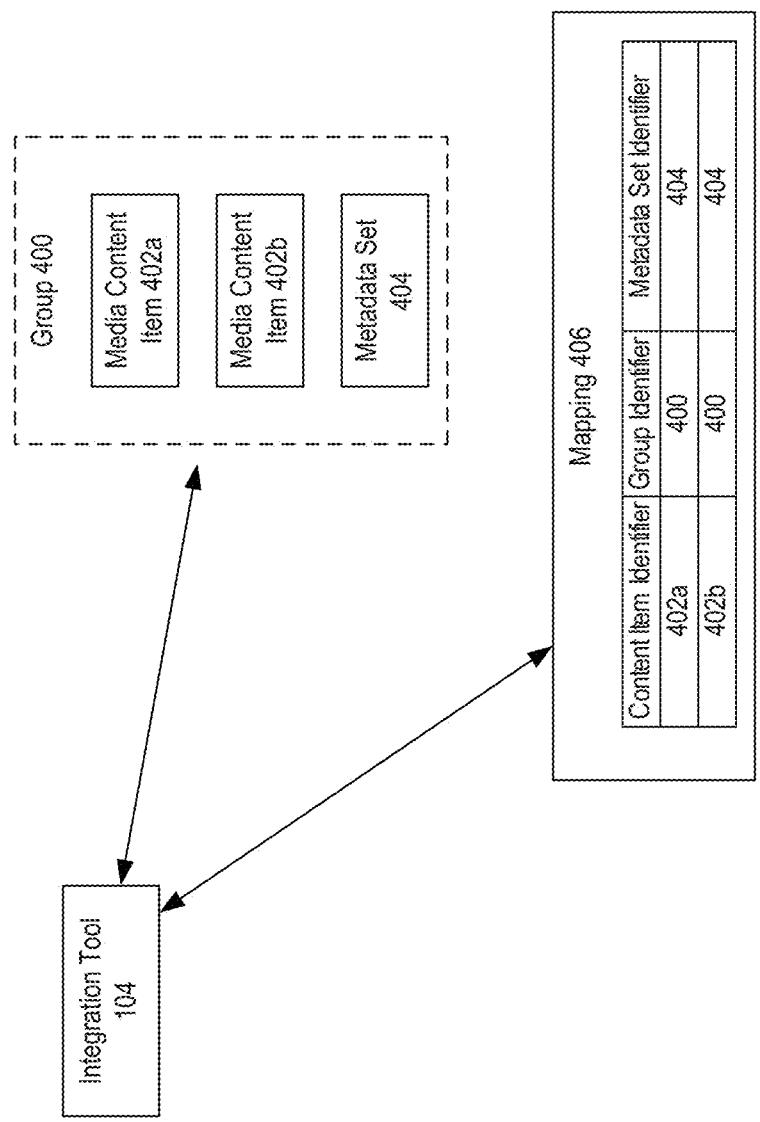
FIG. 4 is a diagram depicting an example in which the integration tool uses a mapping to associate different media content items with a group and a metadata set, according to certain embodiments.

FIG. 4 is a diagram depicting an example in which the integration tool uses a mapping 406 to associate different media content items with a group 400 and a metadata set 404. The mapping 406 can be any suitable data structure having rows, records, or other data items describing media content items 402a, 402b. The media content items 402a, 402b include a subset of the media content items 129 depicted in FIG. 1. Examples of media content items 402a, 402b include videos, images, graphics, etc. A given data item in the mapping 406 includes an identifier for a given media content item and an identifier of a group (e.g., the group 400 depicted in FIG. 4) or project to which the media content item is assigned.

In some embodiments, the mapping 406 includes data describing a metadata set associated with the media content item. A metadata set 404 includes, for example, one or more keywords, one or more tags, or one of more other identifiers that may be applied to media content items when published to a social media service. In these embodiments, the mapping 406 is updated to include identifiers for certain metadata sets that are associated with certain media content items.

Figure 5:
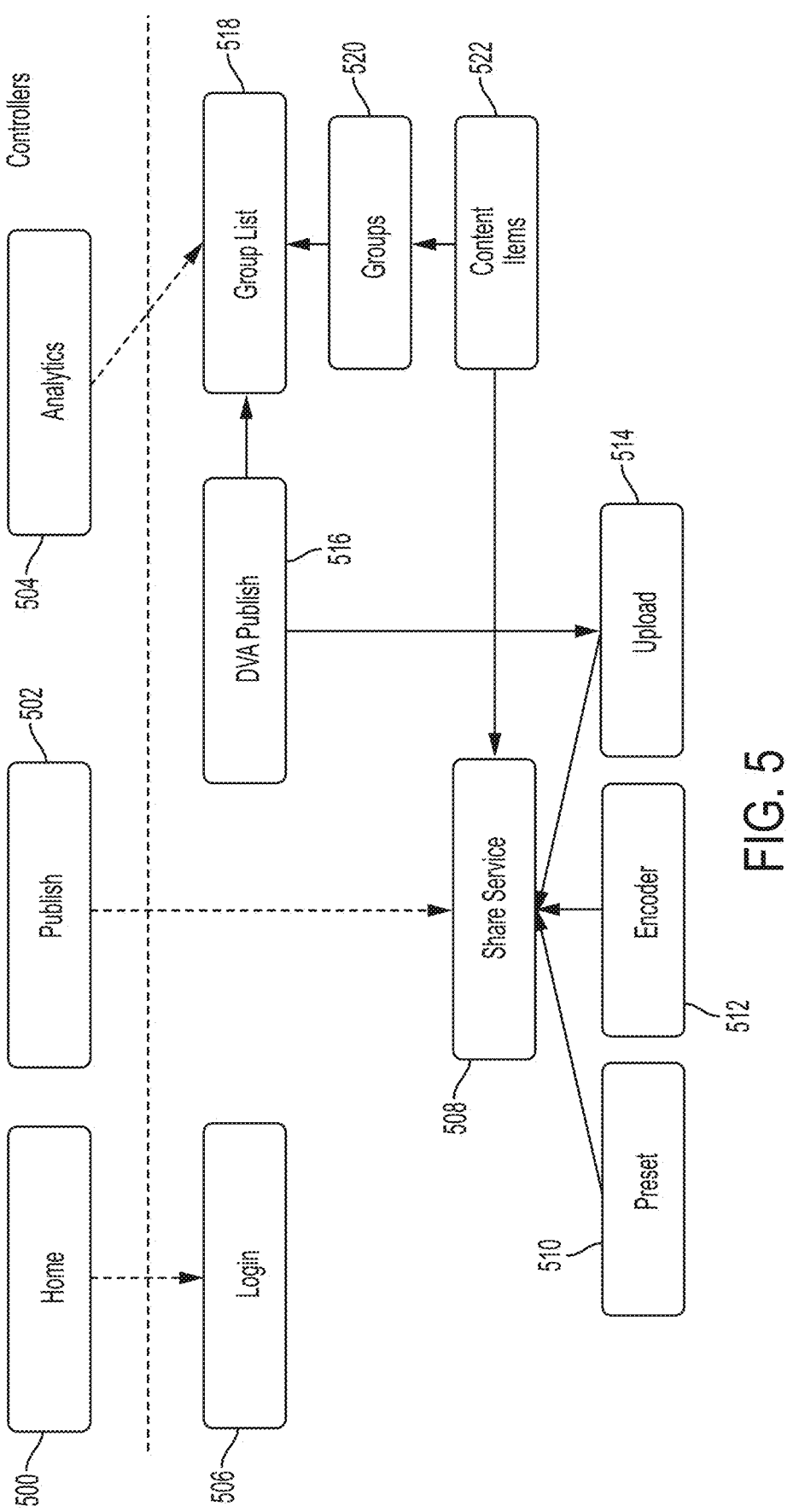
FIG. 5 is a diagram depicting an example of a client architecture for the integration tool, according to certain embodiments.

FIG. 5 is a diagram depicting an example of a client architecture for the integration tool 104. The client architecture includes a home controller 500, a publish controller 502, and an analytics controller 504. Each of the controllers includes one or more software engines for performing one or more functions at a user device 101 at which the integration tool 104 is executed.

Figure 6:
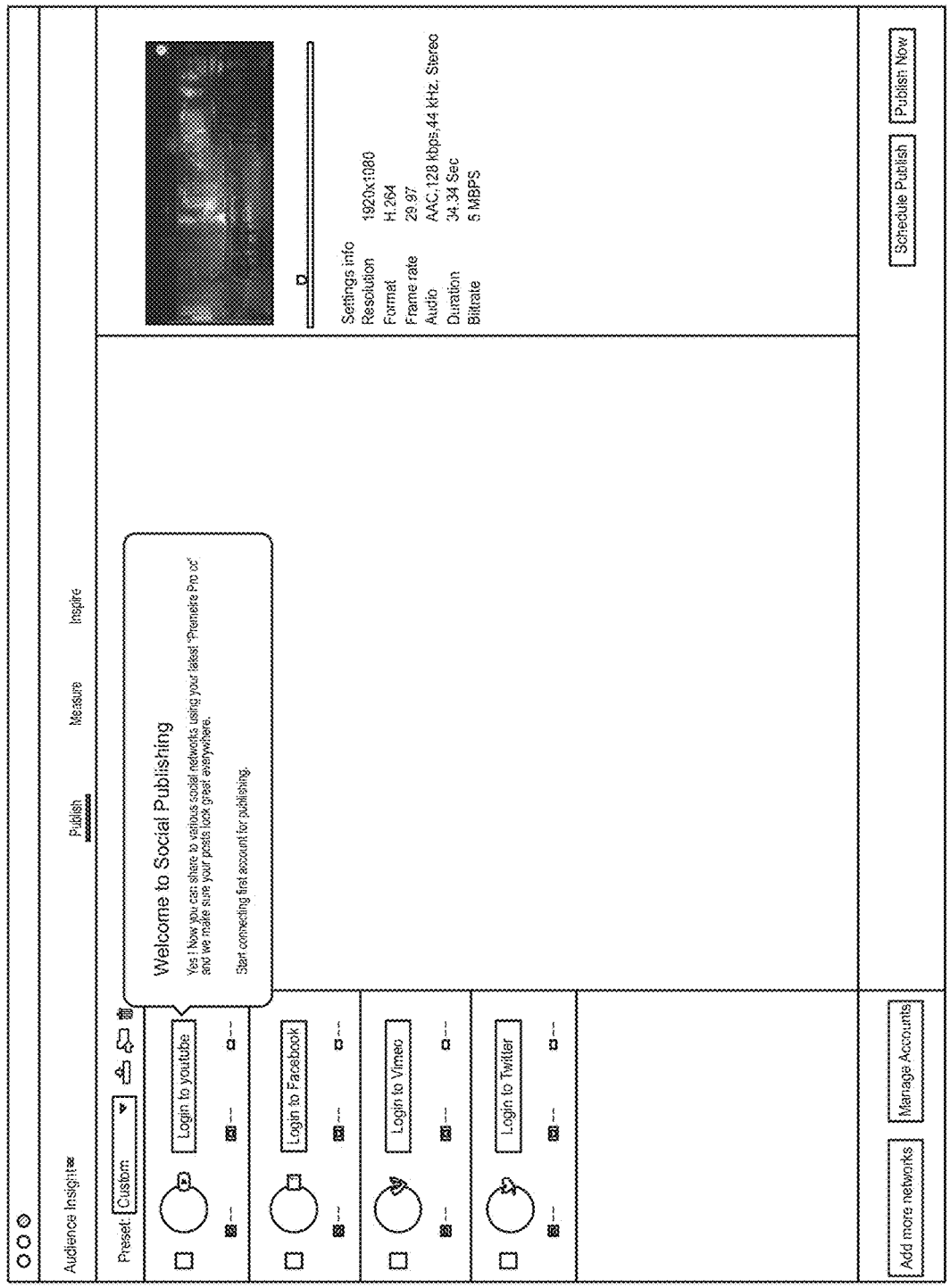
FIG. 6 depicts an example of an analytics interface having a login prompt for various social media services, according to certain embodiments.

The home controller 500 is executed by a suitable processing device to provide a login process. For example, the login process is implemented via a login engine 506, which includes program code for authenticating a user. In some embodiments, an analytics interface 202 is updated to provide one or more login options. For instance, FIG. 6 depicts an interface 600 that allows the user to provide credentials for logging into different social media service (e.g., YouTube®, Facebook®, Twitter™, etc.).

Returning to FIG. 5, the publish controller 502 responds to user inputs received via the analytics interface 202 by causing the user device 101 or another suitable computing system to proceed with publication of media content items. For example, the publish controller 502 executes the share service 508 for publishing media content items. The publish controller 502 controls the grouping of videos, the assignment of tags, and the publication of videos to various social platforms.

The DVA publish feature 516 allows global presets to be configured for different social media services 109. Examples of global presents include encoding parameters that are used to encode videos or other media content items and that are specific to different social media services 109, aspect ratio requirements for different social media services 109, duration restrictions for different social media services 109, etc. The integration tool 104 receives global presets as inputs into the upload engine 514 and group list 518. In one example, the analytics interface 202 is updated to include options for obtaining presets (e.g., encoding parameters) from a user.

Figure 7:
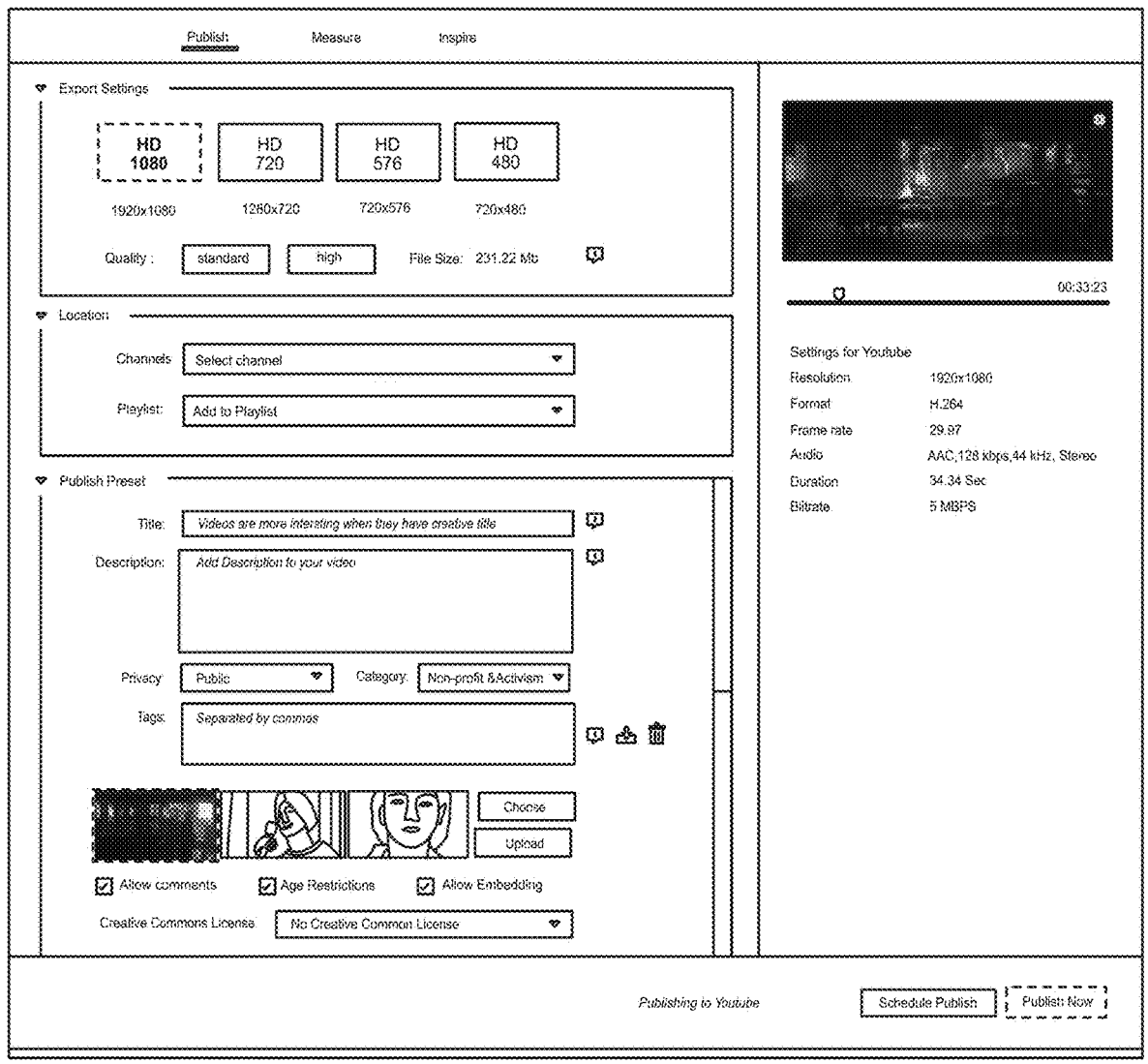
FIG. 7 depicts an example of an analytics interface that elicits publication parameters from a user of the integral tool, according to certain embodiments.

For example, FIG. 7 depicts an example of an updated analytics interface 700. The updated analytics interface 700 includes options for selecting export settings (e.g., resolution, file size, etc.), locations (e.g., channels, playlists, etc.), privacy settings, etc.

Returning to FIG. 5, the share service 508 also obtains configuration parameters from presets 510, receives the content items 522, causes one or more encoder engines 512 to encode a video or other media content item using the configuration parameters, and causes the upload engine 514 to publish the video or media content item to various social media services 109. To obtain analytics information, the user accesses the analytics controller 504. The analytics controller 504 obtains the group list, which contains various groups 520. Each of the groups 520 may contain multiple content items 522.

Figure 8:
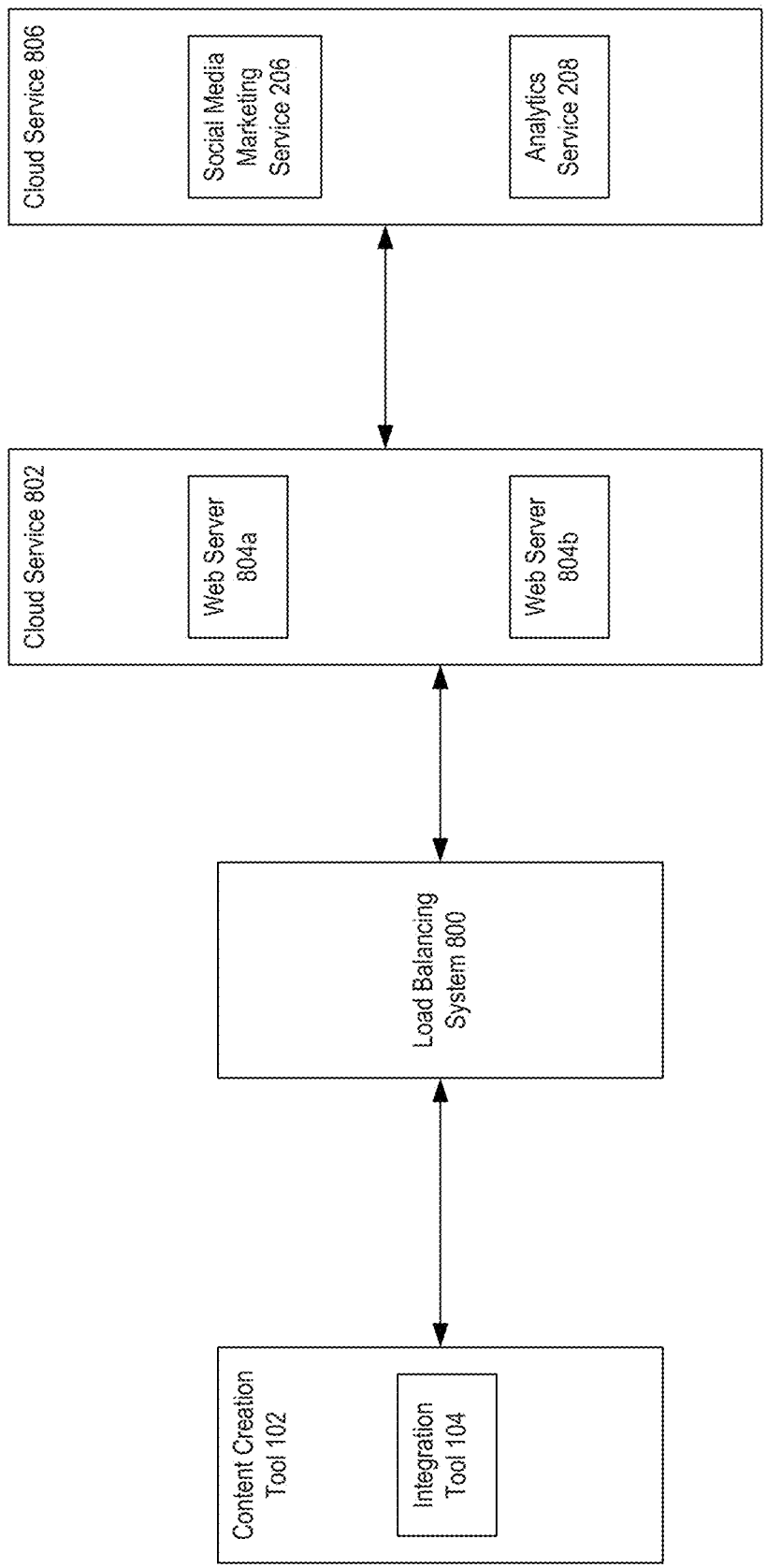
FIG. 8 is a diagram depicting an example of a service architecture used by the integration tool, according to certain embodiments.

FIG. 8 is a diagram depicting an example of a service architecture used by the integration tool 104. The service architecture includes a load balancing system 800, a cloud service 802, and an additional cloud service 806. The load balancing system 800 provides the capability to ensure that resources are adequately balanced between different servers. The cloud service 802 includes web servers 804a, 804b. The cloud service 806 includes the social media marketing service 206 (e.g. Adobe® Social) and the analytics service 208 (e.g. Adobe® Analytics). If an end user watches a video that is part of the system, the web server communicates with the social media marketing service 206 and the analytics service 208 to facilitate the capture of analytics tracking data.

The examples of a client architecture, a service architecture, and various interfaces depicted in FIGS. 5-8 are provided for illustrative purposes. But other implementations may be used. For example, some or all of the client architecture engines depicted in FIG. 5 may be executed on a server system rather than (or in addition to) a user device 101. In another example, one or more features depicted in FIGS. 5-8 may be omitted, consolidated, or otherwise changed.

Figure 9:
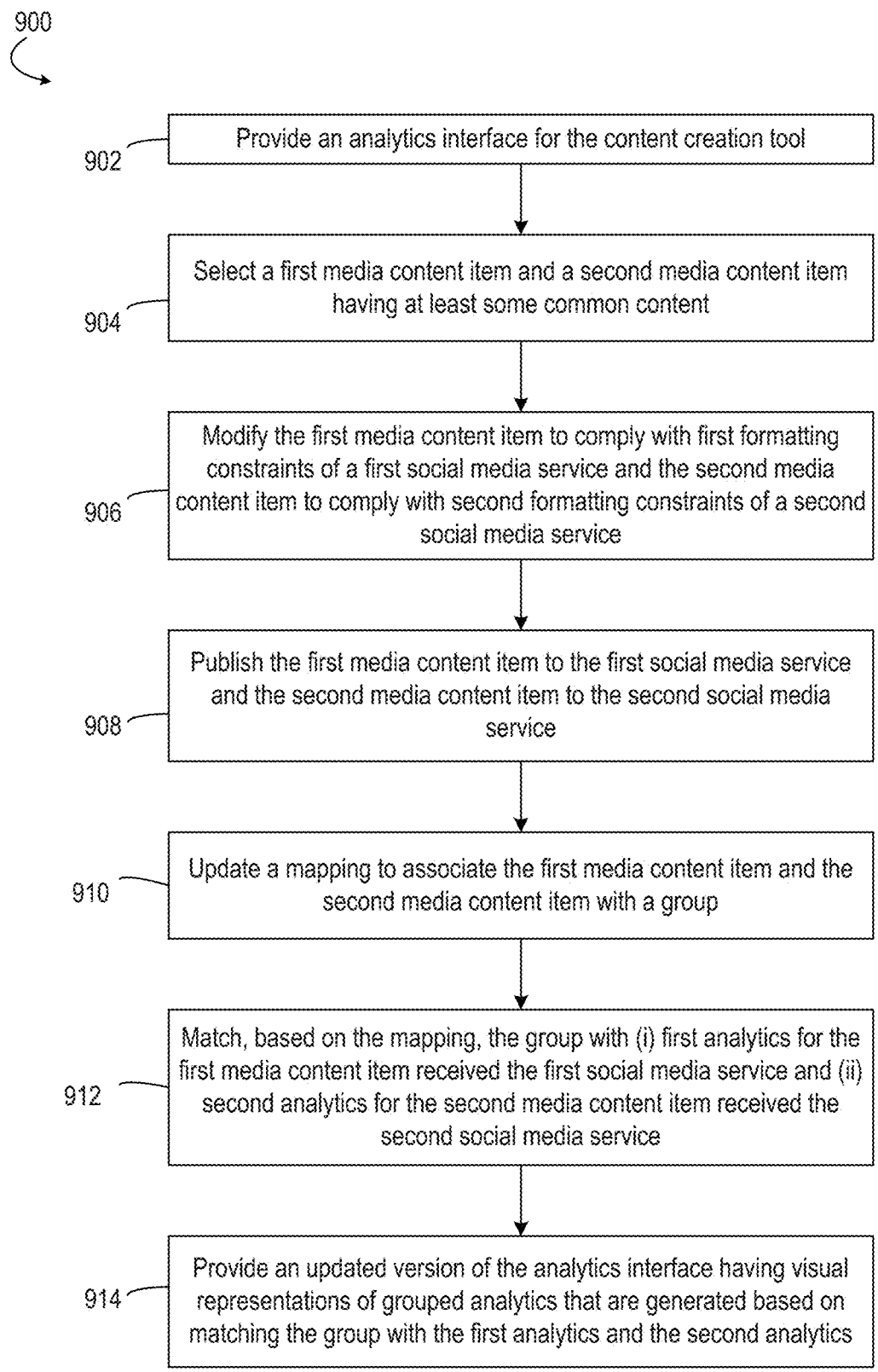
FIG. 9 is a flow chart depicting an example of a method for integrating social media analytics with a content creation tool that is used for creating or modifying the grouped media content, according to certain embodiments.

FIG. 9 is a flow chart depicting an example of a method 900 for integrating social media analytics with a content creation tool. In some embodiments, one or more processing devices implement operations depicted in FIG. 9 by executing suitable program code (e.g., one or more of the content creation tool 102 and the integration tool 104). For illustrative purposes, the method 900 is described with reference to the examples depicted in FIGS. 1-8 and 10-15. Other implementations, however, are possible.

At block 902, the method 900 involves providing an analytics interface for the content creation tool. For instance, at least one processing device executes the integration tool 104 to provide the analytics interface 202 that is depicted in FIG. 2. Examples of the analytics interface 202 are described herein with respect to FIGS. 2, 3, 6, 7, and 10-14.

At block 904, the method 900 involves selecting a first media content item and a second media content item, where a portion of the first media content item has the same content as a portion of the second media content item. For instance, at least one processing device executes the integration tool 104 to receive inputs via the analytics interface 202. The inputs indicate, for example, the media content items 402a, 402b. Examples of these media content items 402a, 402b include videos, still images, graphics, etc. The integration tool 104 accesses a non-transitory computer-readable medium in which the media content items 402a, 402b are stored. The integration tool 104 retrieves or otherwise selects the media content items 402a, 402b from the non-transitory computer-readable medium.

At block 906, the method 900 involves modifying the first media content item to comply with first formatting constraints of a first social media service and modifying the second media content item to comply with second formatting constraints of a second social media service. For instance, one or more processing devices execute suitable program code for modifying the media content items 402a, 402b. In some embodiments, the program code implements one or more content-creation or content-modification features of the content creation tool 102 that are used to modify certain aspects of the media content items 402a, 402b. In additional or alternative embodiments, the program code implements certain features of the integration tool 104 that are used to modify certain aspects of the media content items 402a, 402b.

In some embodiments, formatting constraints of a social media service include duration restrictions. In these embodiments, block 906 involves removing at least some content from a media content item, such as a video, so that the media content item complies with the duration restriction. In additional or alternative embodiments, formatting constraints of a social media service include file format requirements. In these embodiments, block 906 involves using one or more encoder engines 412 to format a video, image, or other media content item so that the media content item is encoded in a file format that is required or otherwise used by a given social media service. In additional or alternative embodiments, formatting constraints of a social media service include aspect ratio requirements. In these embodiments, block 906 involves modifying a video, image, or other media content item so that the media content item has the aspect ratio that is required or otherwise used by a given social media service.

At block 908, the method 900 involves updating a mapping to associate the first media content item and the second media content item with a group. For instance, at least one processing device executes the integration tool 104 to create or update a mapping 406. The integration tool 104 accesses the mapping 406 from a non-transitory computer-readable medium or creates the mapping 406 in the non-transitory computer-readable medium. For each media content item, the integration tool 104 creates a corresponding row, record, or other data item in the mapping 406. The row, record, or other data item in the mapping 406 has an identifier (e.g., a file name) for the media content item. The integration tool 104 adds a group identifier for a group to which the media content item is assigned.

In some embodiments, the analytics interface 202 includes a button or other element that receives input indicating a desire to apply a metadata set 404 to media content items in the group. For example, a metadata set 404 may include one or more keywords, one or more tags, or some combination thereof. The integration tool 104 receives a command that is generated by an interaction with the button or other element. The command indicates that the metadata set 404 should be applied to the media content items in the group 400. The integration tool 104 responds to the command by applying one or more items from the metadata set 404 to one or more of the media content items 402*a*, 402*b*. For example, tags or keywords from the metadata set 404 are applied to the media content items 402*a*, 402*b*. This application of the tags or keywords occurs prior to the media content items 402*a*, 402*b* being published via one or more social media services 109.

Figure 10:
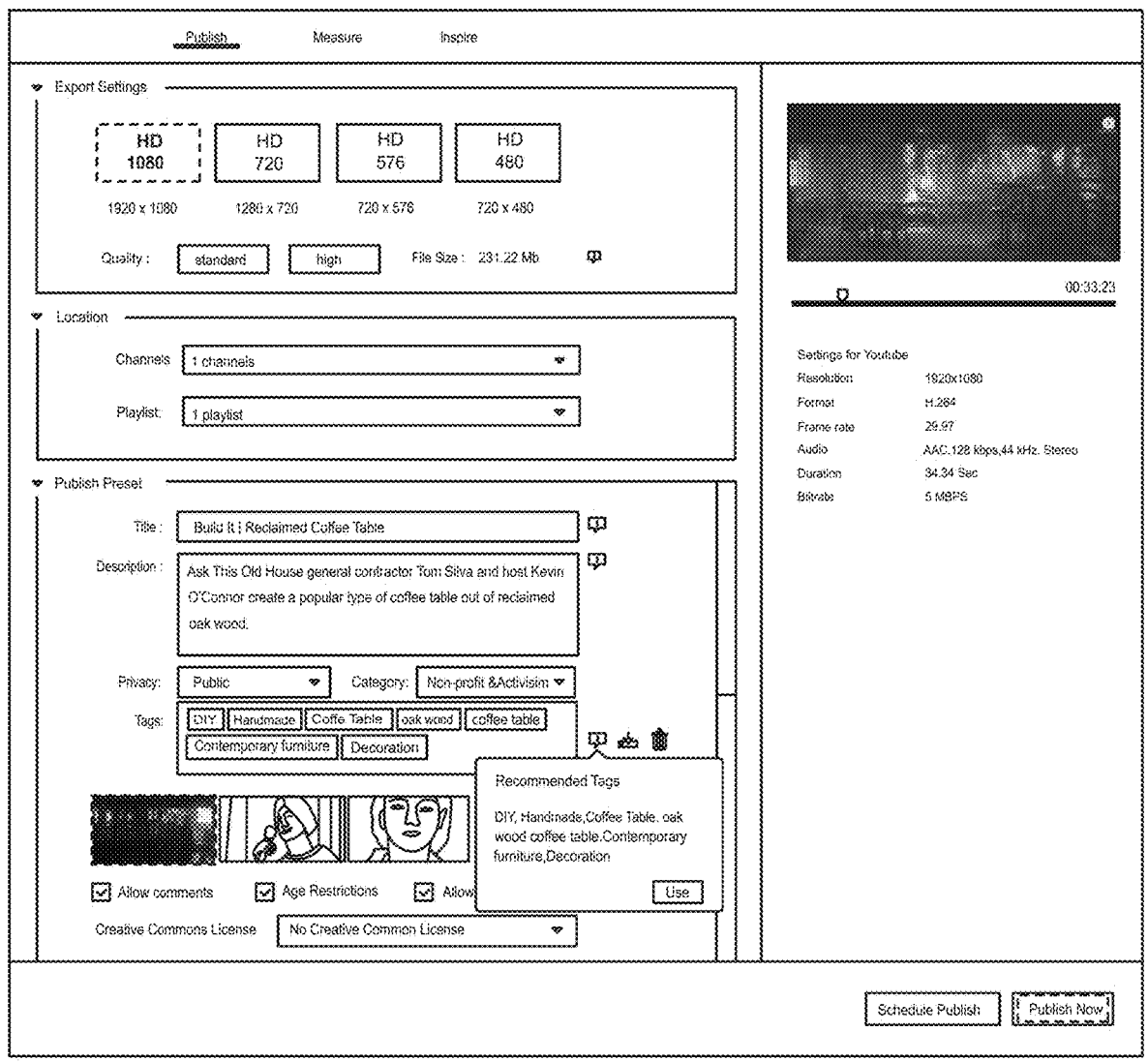
FIG. 10 depicts an example of an analytics interface that suggests certain tags, keywords, or other metadata for application to media content items that are published using the analytics interface, according to certain embodiments.

In some aspects, the integration tool 104 updates the analytics interface 202 to provide suggestions or other options for applying a metadata set 404. An example of such an updated analytics interface is depicted in FIG. 10. FIG. 10 depicts an interface 1000 that includes one or more prompts suggesting certain tags to be added to one or more videos or other media content items during a publication process.

Returning to FIG. 9, the method 900 also involves publishing the first media content item to the first social media service and the second media content item to the second social media service, as depicted at block 910. For instance, at least one processing device executes the integration tool 104 to communicate, via a DVA publish service 204, with a social media marketing service 206. The integration tool 104 transmits (or otherwise provides access to) the media content items 402*a*, 402*b* to the social media marketing service 206 along with instructions to publish the media content items 402*a*, 402*b* to the social media services 109. The media content items 402*a*, 402*b* are published after being modified to comply with any constraints of the social media services 109.

At block 912, the method 900 involves using the mapping to match the group with (i) first analytics for the first media content item received from the first social media service and (ii) second analytics for the second media content item received from the second social media service. For instance, at least one processing device executes the integration tool 104 to communicate, via the DVA publish service 204, with an analytics service 208. The integration tool 104 receives analytics data from the analytics service 208. For example, the analytics service 208 collects analytics regarding one or more interactions involving the media content items 402*a*, 402*b*. Examples of these interactions include searches for the media content items 402*a*, 402*b* (either in the social media services 109 or a separate search engine), views of the media content items 402*a*, 402*b* as published via the social media services 109, interactions (play, stop, pause, skip, etc.) with the media content items 402*a*, 402*b* as published via the social media services 109, etc.

Figure 11:
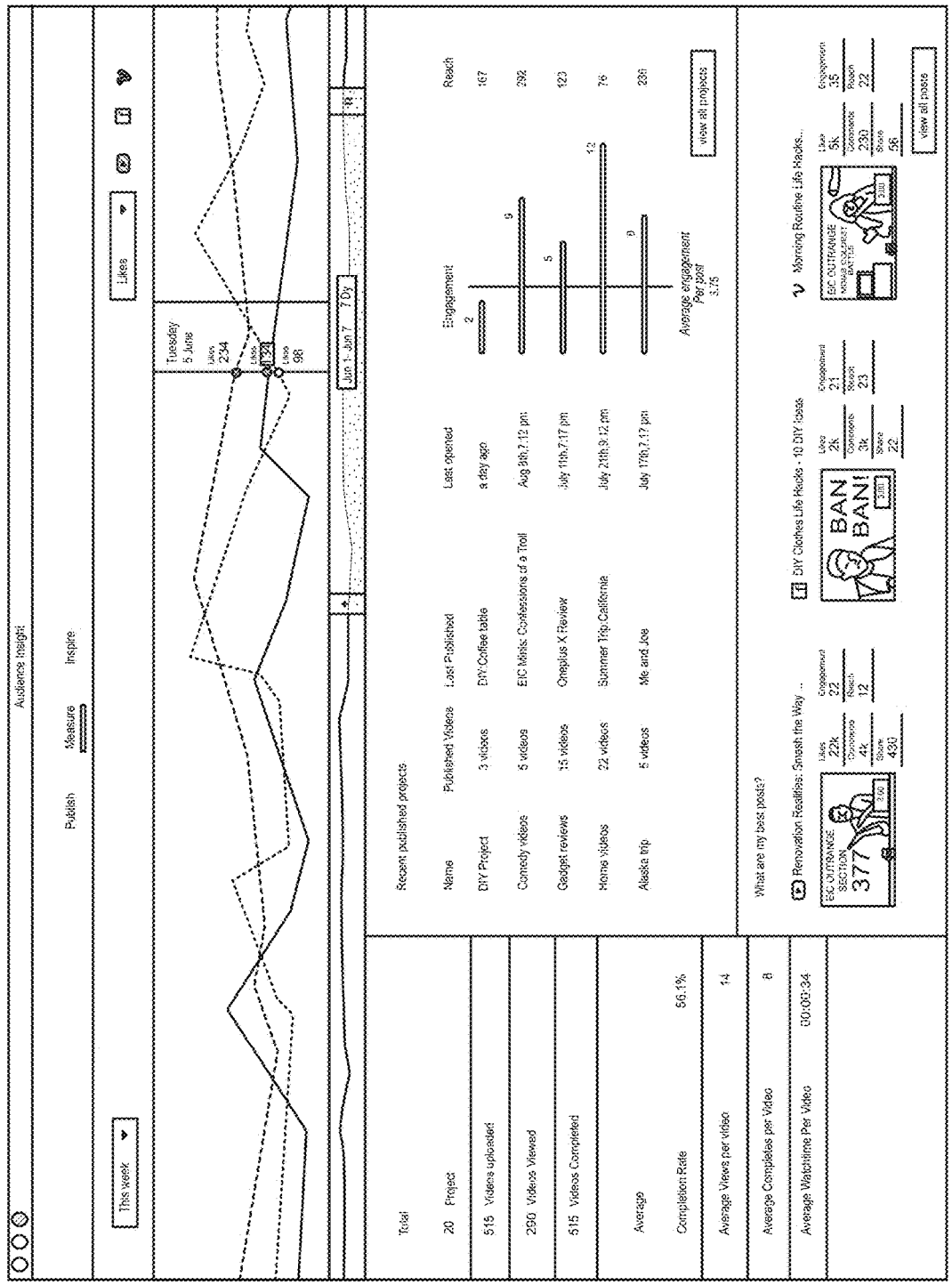
FIG. 11 depicts an example of an analytics interface that displays visual indicators of grouped analytics, according to certain embodiments.
Figure 12:
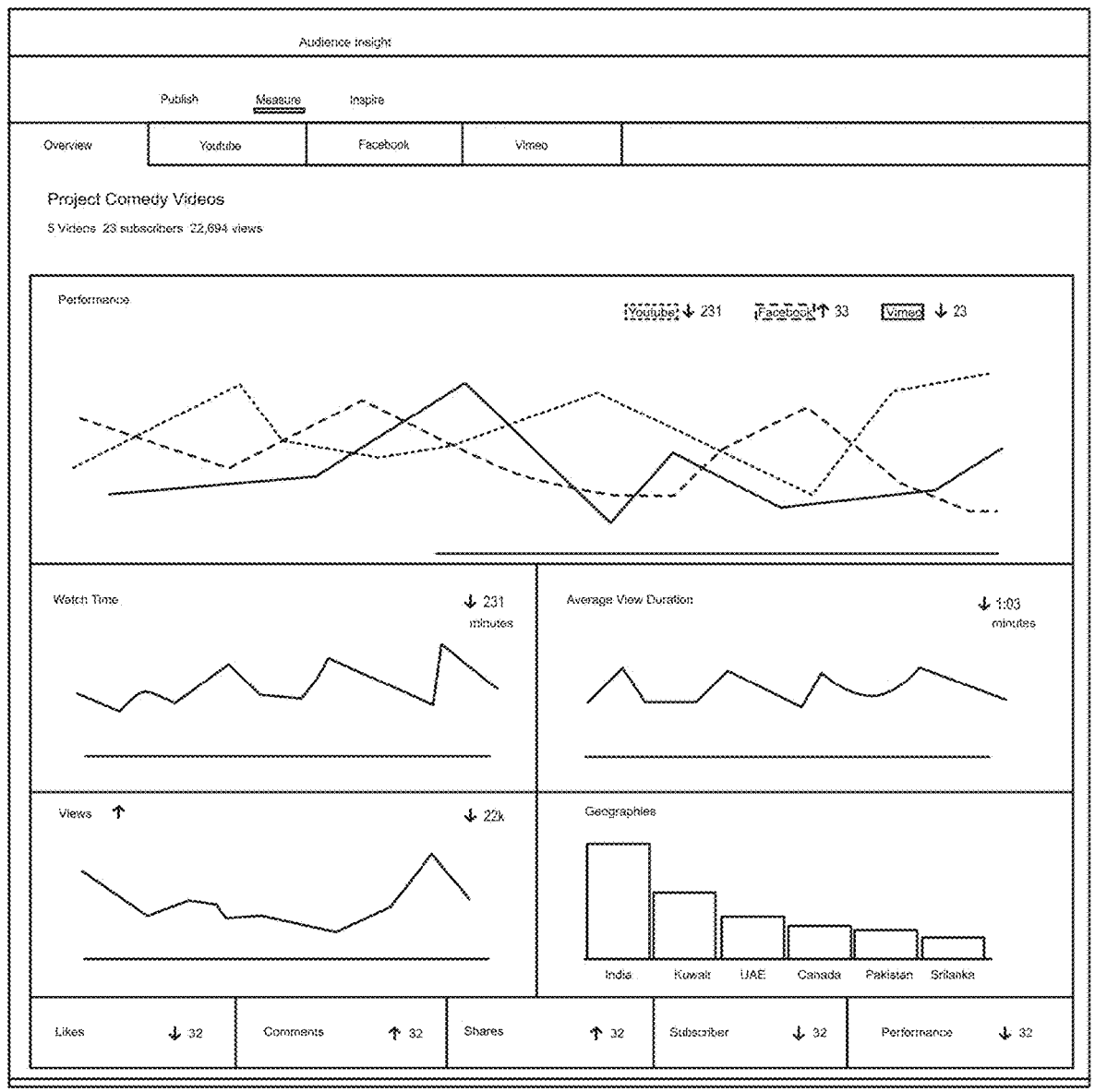
FIG. 12 depicts another example of an analytics interface that displays visual indicators of grouped analytics, according to certain embodiments.

At block 914, the method 900 involves providing an updated version of the analytics interface having visual representations of grouped analytics for the group, where the grouped analytics are generated based on matching the group with the first analytics and the second analytics. For instance, at least one processing device executes the integration tool 104 to update the analytics interface 202 with visual indicators of grouped analytics. In some aspects, the group is associated with categories for at least one of a social media service type, group tags, or keywords. Examples of an updated analytics interface 202 with visual indicators of grouped analytics are depicted in FIGS. 11 and 12. In the interface 1100 depicted in FIG. 11 and the interface 1200 depicted in FIG. 12, performance data is categorized by social media service, watch time, average view duration, numbers of views, analytics for different geographic regions, etc.

In some embodiments, the integration tool 104 allows a user to identify certain portions of a media content item that are correlated with changes in viewer response (e.g., increases in views, increased interaction, navigating away from a video, stopping a video, etc.) For instance, if a media content item is a video, the integration tool 104 causes playback of the video in the analytics interface 202 or another suitable interface of the content creation tool 102. The integration tool 104 uses the grouped analytics to identify a change in viewer response to the video. The integration tool 104 determines that the change in viewer response exceeds a threshold change. The threshold change may be a user-provided number, a statistical threshold (e.g., a median number of views or interactions, a certain number of standard deviations in the distribution of views or interactions, etc.), or any other threshold. Based on this determination, the integration tool 104 updates the analytics interface 202 (or causes the content creation tool 102 to update another suitable user interface) to indicate a portion of the video associated with the change in viewer response. For example, if the video is being played in the content creation tool, the integration tool provides an indicator in the analytics interface when the relevant video portion is being played, overlays a visual indicator on the relevant portion of the video being played, or otherwise visually indicates that certain video content is associated with the determined change in viewer response.

Figure 13:
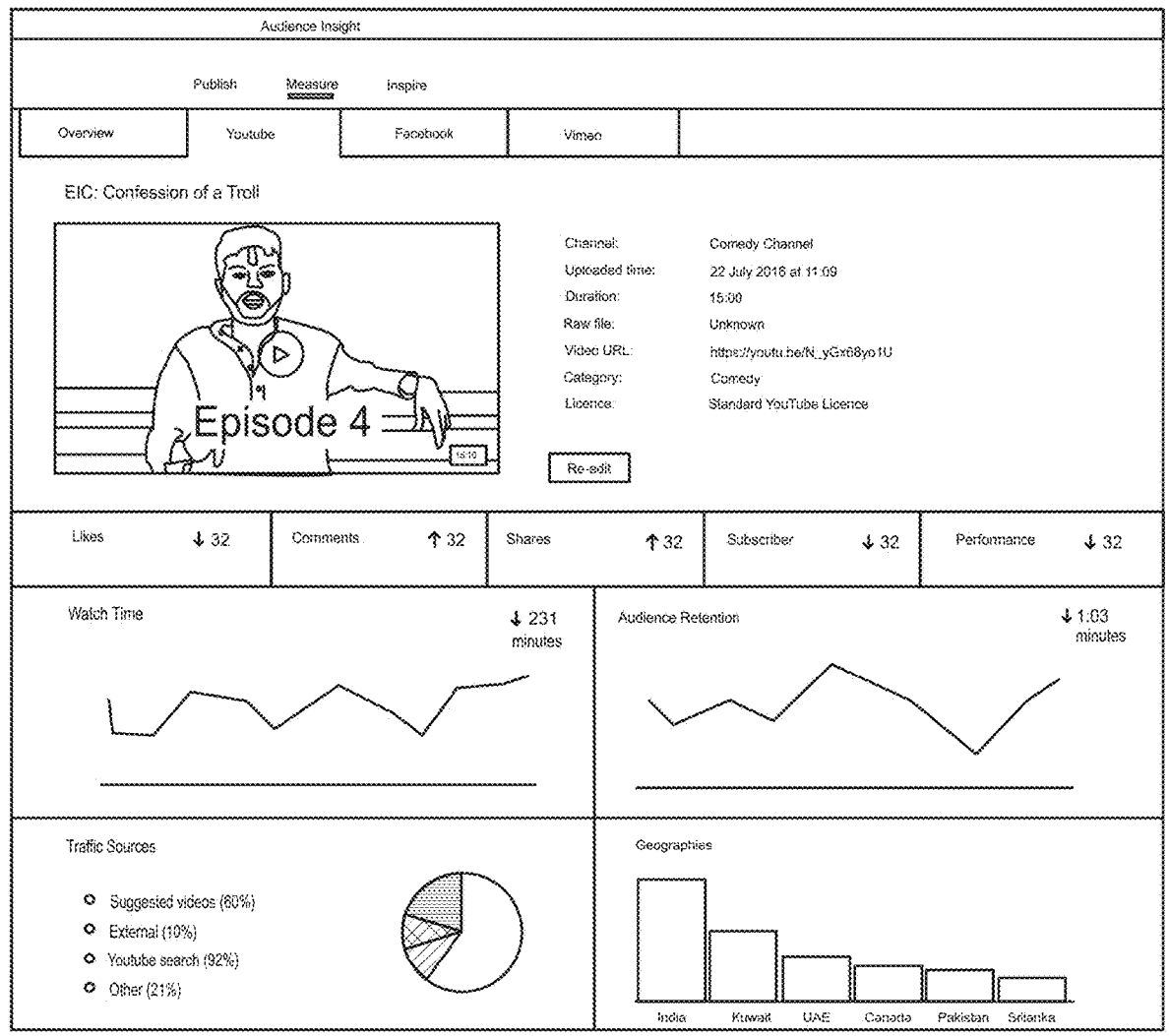
FIG. 13 depicts an example of an analytics interface that displays visual indicators of service-specific analytics, according to certain embodiments.
Figure 14:
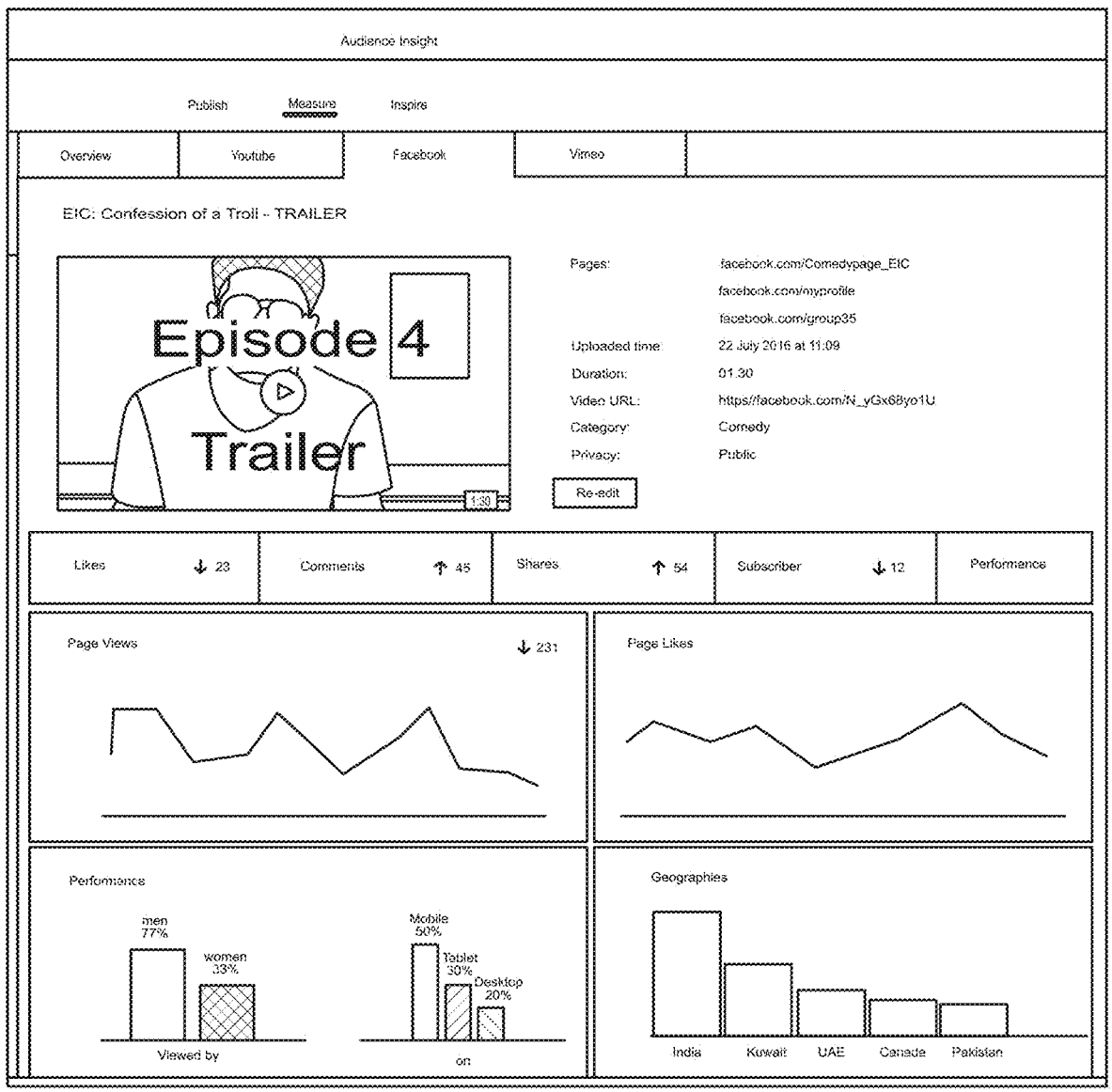
FIG. 14 depicts another example of an analytics interface that displays visual indicators of service-specific analytics, according to certain embodiments.

In some embodiments, the integration tool 104 allows a user to view analytics for a specific media content item published to a particular social media service. For example, the integration tool generates an updated version of the analytics interface 202 having a visual representation of service-specific analytics generated from interactions with a certain media content item via a certain social media service. This feature allows service-specific analytics for certain media content items from the group (e.g., analytics specific to a video published to a certain social media service) to be viewed and analyzed individually by a user of the content creation tool 102. Examples of an updated analytics interface 202 with visual indicators of service-specific analytics are depicted in FIGS. 13 and 14. In the interfaces 1300 and 1400 depicted in FIGS. 13 and 14, respectively, different tabs correspond to different social media services and their associated service-specific analytics.

Example of a Computing System for Analytics Integration

Figure 15:
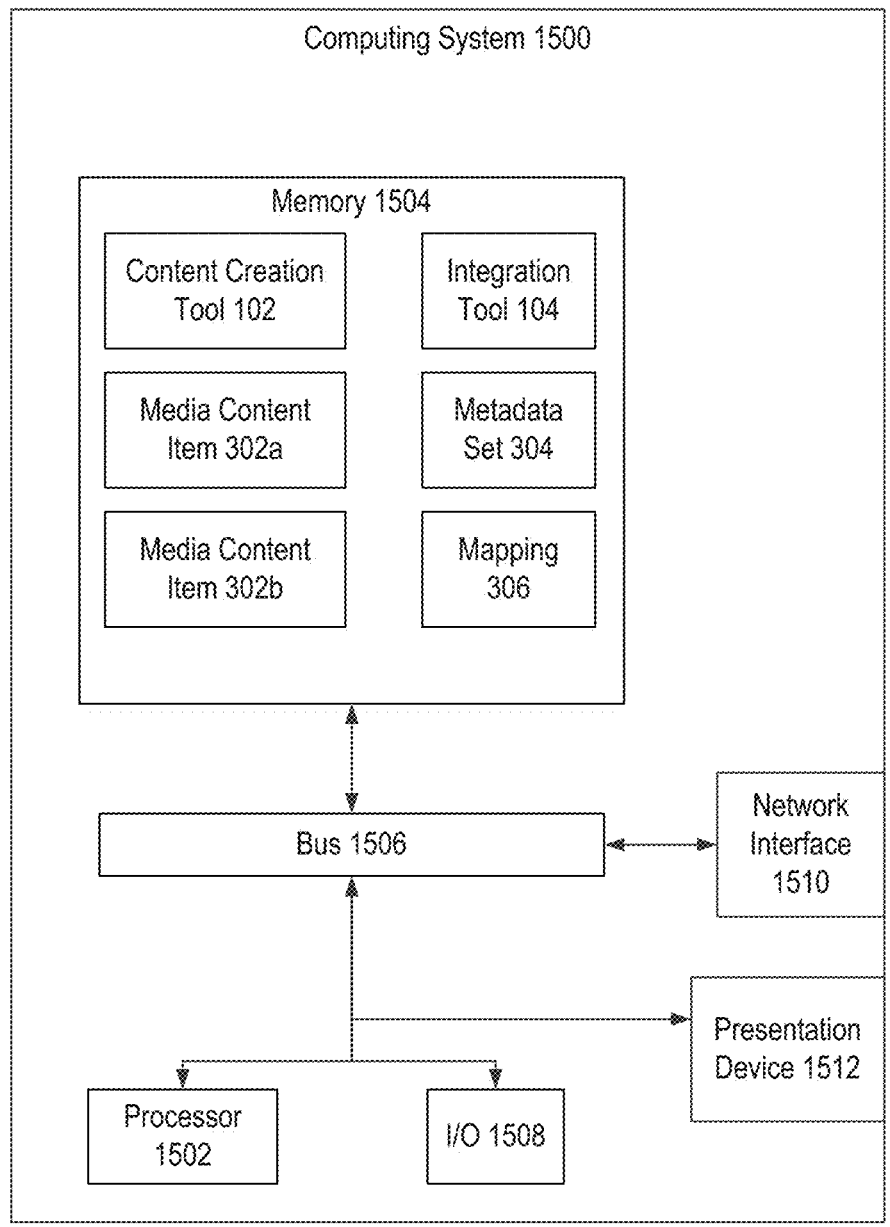
FIG. 15 is a block diagram depicting an example of a computing system that executes an integration tool used for integrating social media analytics with a content creation tool, according to certain embodiments.

Any suitable computing system or group of computing systems can be used for performing the operations described herein. For example, FIG. 15 is a block diagram depicting an example of a computing system 1500 that executes an integration tool 104 used for integrating social media analytics with a content creation tool 102. An example of a computing system 1500 is the user device 101 depicted in FIG. 1.

The depicted example of the computing system 1500 includes one or more processors 1502 communicatively coupled to one or more memory devices 1504. The processor 1502 executes computer-executable program code stored in the memory device 1504, accesses information stored in the memory device 1504, or both. Examples of the processor 1502 include a microprocessor, an application-specific integrated circuit ("ASIC"), a field-programmable gate array ("FPGA"), or any other suitable processing device. The processor 1502 can include any number of processing devices, including one.

The memory device 1504 includes any suitable non-transitory computer-readable medium for storing the integration tool 104. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 1500 may also include a number of external or internal devices such as input or output devices. For example, the computing system 1500 is shown with an input/output ("I/O") interface 1508 that can receive input from input devices or provide output to output devices. A bus 1506 can also be included in the computing system 1500. The bus 1506 can communicatively couple one or more components of the computing system 1500.

The computing system 1500 executes program code that configures the processor 1502 to perform one or more of the operations described herein. The program code includes, for example, the content creation tool 102, the integration tool 104, or other suitable applications that perform one or more operations described herein. The program code may be resident in the memory device 1504 or any suitable computer-readable medium and may be executed by the processor 1502 or any other suitable processor. In some embodiments, the program code described above is stored in the memory device 1504, as depicted in FIG. 15. In additional or alternative embodiments, the program code described above is stored in one or more memory devices accessible via a data network.

The computing system 1500 can access one or more of the media content items 402a, 402b, the metadata set 404, and the mapping 406 in any suitable manner. In some embodiments, some or all of one or more of the media content items 402a, 402b, the metadata set 404, and the mapping 406 is stored in the memory device 1504, as in the example depicted in FIG. 15. In additional or alternative embodiments, one or more of the media content items 402a, 402b, the metadata set 404, and the mapping 406 is stored in one or more memory devices accessible via a data network.

The computing system 1500 depicted in FIG. 15 also includes at least one network interface 1510. The network interface 1510 includes any device or group of devices suitable for establishing a wired or wireless data connection to one or more data networks. Non-limiting examples of the network interface 1510 include an Ethernet network adapter, a modem, and/or the like. The computing system 1500 is able to communicate with one or more other computing devices via a data network using the network interface 1510.

In some embodiments, the computing system 1500 includes a presentation device 1512, as depicted in FIG. 15. A presentation device 1512 can include any device or group of devices suitable for providing visual, auditory, or other suitable sensory output. Non-limiting examples of the presentation device 1512 include a touchscreen, a monitor, a speaker, a separate mobile computing device, etc. In some embodiments, the integration tool 104 configures the presentation device 1512 to present one or more analytics interfaces 202 that are generated or updated by the integration tool 104.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for integrating social media analytics, which describe interactions with grouped media content across multiple social media services, with a content creation tool used for creating or modifying the grouped media content, the method comprising:
 providing, by a processing device, an analytics interface for the content creation tool;
 performing, by the processing device and based on input received via the analytics interface, operations comprising:
  selecting a first video item and a second video item, wherein at least a first video segment and a second video segment are included in both the first video item and the second video item,
  modifying the first video item to comply with first formatting constraints of a first social media service and the second video item to comply with second formatting constraints of a second social media service,
  updating a mapping to associate the first video item and the second video item with a group, and
  publishing the first video item to the first social media service and the second video item to the second social media service;
 matching, by the processing device and based on the mapping, the group with (i) first analytics for the first video item received from the first social media service and (ii) second analytics for the second video item received from the second social media service;
 identifying, by the processing device and from a combination of the first analytics and the second analytics, a change in viewer response associated with the first video segment;
 determining, by the processing device, that the change in viewer response exceeds a threshold change;
 updating, by the processing device and based on determining that the change exceeds the threshold change, the analytics interface to include, during a playback of the first video segment, an indicator identifying the first video segment as being associated with the change in viewer response; and
 updating, by the processing device, the analytics interface to omit the indicator during a playback of the second video segment.

2. The method of claim 1, wherein updating the mapping to associate the first video item and the second video item with the group comprises updating a mapping data structure by at least modifying (i) a first record describing the first video item to include a reference to the group and (ii) a second record describing the second video item to include a reference to the group, wherein said updating of the mapping data structure causes the first video item and the second video item to be associated with the group, wherein the analytics interface comprises an element for applying metadata to video items in the group, wherein the metadata comprises at least one of a keyword or a tag, wherein the method further comprises:
 receiving, by the processing device, a command that is generated by an interaction with the element, wherein the command indicates that the metadata should be applied to the video items in the group; and
 applying, by the processing device and responsive to the command, the metadata to (i) the first video item prior to publishing the first video item to the first social media service and (ii) the second video item prior to publishing the second video item to the second social media service.

3. The method of claim 2, wherein the first video item and the second video item are generated from video content,
 wherein modifying the first video item to comply with the first formatting constraints of the first social media service comprises modifying the video content to comply with at least one of a duration restriction for the first social media service, a file format requirement for the first social media service, or an aspect ratio requirement for the first social media service,
 wherein modifying the second video item to comply with the second formatting constraints of the second social media service comprises modifying the video content to comply with at least one of a duration restriction for the second social media service, a file format requirement for the second social media service, or an aspect ratio requirement for the second social media service.

4. The method of claim 2, wherein the first video item comprises at least one of a first video, a first still image, or a first graphic,
 wherein the second video item comprises at least one of a second video, a second still image, or a second graphic.

5. The method of claim 1, further comprising updating the analytics interface to display combined analytics for both (i) interactions with the first video item via the first social media service and (ii) interactions with the second video item via the second social media service.

6. The method of claim 5, further comprising providing an updated version of the analytics interface having a visual representation of service-specific analytics generated from the interactions with the first video item via the first social media service.

7. The method of claim 1, wherein the group is associated with categories for at least one of a social media service type, group tags, or keywords.

8. A system for integrating social media analytics, which describe interactions with grouped media content across multiple social media services, with a content creation tool used for creating or modifying the grouped media content, the system comprising:
 one or more processing devices configured for performing operations that comprise:
  providing a client device with access to an analytics interface for the content creation tool,
  selecting, responsive to input via the analytics interface, a first video item and a second video item, wherein at least a portion of the first video item has the same content as at least of a portion of the second video item,
  modifying the first video item to comply with first formatting constraints of a first social media service and the second video item to comply with second formatting constraints of a second social media service,
  updating a mapping to associate the first video item and the second video item with a group,
  publishing the first video item to the first social media service and the second video item to the second social media service,
  matching, based on the mapping, the group with (i) first analytics for the first video item received from the first social media service and (ii) second analytics for the second video item received from the second social media service;

identifying, from a combination of the first analytics and the second analytics, a change in viewer response associated with a first video segment, determining that the change in viewer response exceeds a threshold change, updating the analytics interface to include, during a playback of the first video segment, an indicator identifying the first video segment as being associated with the change in viewer response, and providing the client device with access to the updated analytics interface.

9. The system of claim 8, wherein updating the mapping to associate the first video item and the second video item with the group comprises updating a mapping data structure by at least modifying (i) a first record describing the first video item to include a reference to the group and (ii) a second record describing the second video item to include a reference to the group, wherein said updating of the mapping data structure causes the first video item and the second video item to be associated with the group, wherein the analytics interface comprises an element for applying metadata to video items in the group, wherein the metadata comprises at least one of a keyword or a tag, wherein the operations further comprise:

receiving a command that is generated by an interaction with the element, wherein the command indicates that the metadata should be applied to the video items in the group; and applying, responsive to the command, the metadata to (i) the first video item prior to publishing the first video item to the first social media service and (ii) the second video item prior to publishing the second video item to the second social media service.

10. The system of claim 9, wherein the first video item and the second video item are generated from video content, wherein modifying the first video item to comply with the first formatting constraints of the first social media service comprises modifying the video content to comply with at least one of a duration restriction for the first social media service, a file format requirement for the first social media service, or an aspect ratio requirement for the first social media service, wherein modifying the second video item to comply with the second formatting constraints of the second social media service comprises modifying the video content to comply with at least one of a duration restriction for the second social media service, a file format requirement for the second social media service, or an aspect ratio requirement for the second social media service.

11. The system of claim 9, wherein the first video item comprises at least one of a first video, a first still image, or a first graphic, wherein the second video item comprises at least one of a second video, a second still image, or a second graphic.

12. The system of claim 8, wherein the operations further comprise updating the analytics interface to display combined analytics for both (i) interactions with the first video item via the first social media service and (ii) interactions with the second video item via the first second social media service.

13. The system of claim 12, wherein the operations further comprise providing an updated version of the analytics interface having a visual representation of service-specific analytics generated from the interactions with the first video item via the first social media service.

14. The system of claim 8, wherein the group is associated with categories for at least one of a social media service type, group tags, or keywords.

15. A non-transitory computer-readable medium having program code that is stored thereon and that is executable by a processing device for performing operations, the operations comprising:

providing an analytics interface for a content creation tool;

performing, based on input received via the analytics interface, operations comprising:

selecting a first video item and a second video item, wherein at least first video segment and a second video segment are included in both the first video item and the second video item, modifying the first video item to comply with first formatting constraints of a first social media service and the second video item to comply with second formatting constraints of a second social media service, updating a mapping to associate the first video item and the second video item with a group, and publishing the first video item to the first social media service and the second video item to the second social media service;

matching, based on the mapping, the group with (i) first analytics for the first video item received from the first social media service and (ii) second analytics for the second video item received from the second social media service;

identifying, from a combination of the first analytics and the second analytics, a change in viewer response associated with the first video segment;

determining that the change in viewer response exceeds a threshold change;

updating, based on determining that the change exceeds the threshold change, the analytics interface to include, during a playback of the first video segment, an indicator identifying the first video segment as being associated with the change in viewer response; and omitting the indicator from the analytics interface during a playback of the second video segment.

16. The non-transitory computer-readable medium of claim 15, wherein updating the mapping to associate the first video item and the second video item with the group comprises updating a mapping data structure by at least modifying (i) a first record describing the first video item to include a reference to the group and (ii) a second record describing the second video item to include a reference to the group, wherein said updating of the mapping data structure causes the first video item and the second video item to be associated with the group, wherein the analytics interface comprises an element for applying metadata to video items in the group, wherein the metadata comprises at least one of a keyword or a tag, wherein the operations further comprise:

receiving a command that is generated by an interaction with the element, wherein the command indicates that the metadata should be applied to the video items in the group; and applying, responsive to the command, the metadata to (i) the first video item prior to publishing the first video item to the first social media service and (ii) the second video item prior to publishing the second video item to the second social media service.

17. The non-transitory computer-readable medium of claim 15, wherein the operations further comprises updating the analytics interface to display combined analytics for both (i) interactions with the first video item via the first social media service and (ii) interactions with the second video item via the second social media service.

18. The method of claim 1, further comprising:
- executing an integration tool that is a plug-in to the content creation tool, wherein the integration tool provides the analytics interface for the content creation tool;
- establishing, via the integration tool, a communication link with an analytics service external to the content creation tool; and
- retrieving, with the integration tool and via the communication link, the first analytics and the second analytics.

19. The method of claim 18, further comprising, prior to publishing the first video item to the first social media service and the second video item to the second social media service:
- causing, by the integration tool, a log-in prompt for one or more of the first social media service and the second social media service to be presented within a content-creation interface of the content creation tool;
- receiving, via the log-in prompt, a credential for the one or more of the first social media service and the second social media service; and
- authenticating a user of the content creation tool with the one or more of the first social media service and the second social media service.

* * * * *